United States Patent
Poth

(10) Patent No.: US 8,078,325 B2
(45) Date of Patent: *Dec. 13, 2011

(54) USAGE MONITORING HVAC CONTROL METHOD

(75) Inventor: Robert J. Poth, Austin, TX (US)

(73) Assignee: MMI Controls Ltd., Austin, TX (US)

( * ) Notice: Subject to any disclaimer, the term of this patent is extended or adjusted under 35 U.S.C. 154(b) by 284 days.

This patent is subject to a terminal disclaimer.

(21) Appl. No.: 11/982,001

(22) Filed: Oct. 29, 2007

(65) Prior Publication Data

US 2008/0183335 A1 Jul. 31, 2008

Related U.S. Application Data

(60) Continuation of application No. 11/018,667, filed on Dec. 21, 2004, now Pat. No. 7,555,364, which is a continuation-in-part of application No. 10/817,497, filed on Apr. 2, 2004, now Pat. No. 7,216,015, which is a division of application No. 09/935,281, filed on Aug. 22, 2001, now Pat. No. 6,741,915.

(51) Int. Cl.
*G06F 19/00* (2006.01)

(52) U.S. Cl. ................................... 700/276; 700/237
(58) Field of Classification Search .............. 700/276, 700/277; 165/268
See application file for complete search history.

(56) References Cited

U.S. PATENT DOCUMENTS

| | | | | |
|---|---|---|---|---|
| 5,289,362 A | * | 2/1994 | Liebl et al. | 700/22 |
| 5,958,016 A | * | 9/1999 | Chang et al. | 709/229 |
| 6,741,915 B2 | * | 5/2004 | Poth | 700/276 |
| 2001/0020644 A1 | * | 9/2001 | Gauthier et al. | 236/11 |

* cited by examiner

*Primary Examiner* — Albert Decady
*Assistant Examiner* — Douglas Lee
(74) *Attorney, Agent, or Firm* — John Bruckner PC

(57) ABSTRACT

Systems and methods are described for a usage monitoring HVAC control method. A method, includes: receiving a request for an additional period of heating ventilation and air conditioning system services from a requesting system user, the requesting system user composing a plurality of system users; maintaining a data structure in an on board memory of a programmable thermostat, the data structure including a list of time entries, each time entry associated with one of the plurality of system users; and updating the data structure by adding a duration in units of time to the time associated with the requesting system user.

7 Claims, 11 Drawing Sheets

USAGE MONITORING HVAC CONTROL METHOD

CROSS-REFERENCES TO RELATED APPLICATIONS

This application is a continuation of and claims a benefit of priority under 35 U.S.C. 120 from utility patent application U.S. Ser. No. 11/018,667, filed Dec. 21, 2004 now U.S. Pat. No. 7,555,364 which in turn is a continuation-in-part of, and claims a benefit of priority under 35 U.S.C. 120 from utility patent application U.S. Ser. No. 10/817,497, filed Apr. 2, 2004 (now U.S. Pat. No. 7,216,015, issued May 8, 2007) which in-turn is a divisional of, and claims a benefit of priority under 35 U.S.C. 120 from U.S. Ser. No. 09/935,281, filed Aug. 22, 2001 (now U.S. Pat. No. 6,741,915, issued May 25, 2004), the entire contents of all of which are hereby expressly incorporated herein by reference for all purposes.

BACKGROUND OF THE INVENTION

1. Field of the Invention

The invention relates generally to the field of programmable heating, ventilation, and air conditioning (HVAC) systems. More particularly, the invention relates to energy saving programmable HVAC systems. Specifically, a preferred implementation of the invention relates to a usage monitoring programmable HVAC system.

2. Discussion of the Related Art

Heating, ventilation, and air conditioning (HVAC) systems consume a large amount of energy. Commonly, heating and cooling operations are controlled automatically with a thermostat or plurality of thermostats which initiate these operations according to preset temperature limits. The thermostat can be located at a predetermined central local or the plurality of thermostats can be located at a predetermined plurality of locations. The thermostats are capable of detecting changes in room temperature. When the room temperature fluctuates outside the preset high and low temperature limits, the thermostats can trigger a heating, ventilation, and air conditioning unit to heat or cool the room, thus maintaining the room temperature between the preset limits. The thermostats regulate room temperature in this manner regardless of whether or not the building is occupied. Since many buildings may be unoccupied for certain periods of time, the continuous operation of such conventional HVAC systems would result in wastage of a large amount of energy. Attempts have been made to reduce energy wastage by including a timer that simply terminates HVAC system function during a preset interval. Such provision is often impractical since most buildings do not have regular occupancy patterns.

Another problem associated with conventional HVAC systems is the unavailability of personalized billing. Generally, all users of a conventional HVAC system have to pay an equal portion of fixed and variable costs associated with continued operations of the HVAC system. As a result, users often have to pay for HVAC services used by another user.

Heretofore, the requirements of energy conservation and personalized billing referred to above have not been fully met. What is needed is a solution that simultaneously addresses both of these requirements.

SUMMARY OF THE INVENTION

There is a need for the following embodiments. Of course, the invention is not limited to these embodiments.

According to an aspect of the invention, a method comprises: a method, comprises: providing a usage monitoring heating ventilation and air conditioning control system, the usage monitoring heating ventilation and air conditioning control system including a programmable digital thermostat with an on board memory; issuing personal identification numbers to each of a plurality of system users; associating each of the plurality of system users with at least one of a plurality of user types; storing the personal identification numbers in a first data structure in the on board memory; and linking each one of a plurality of entries in the first data structure by reference to at least one of a plurality of entries in a second data structure in the on board memory, the second data structure including a list of user types. According to another aspect of the invention, a method, comprises: receiving a request for an additional period of heating ventilation and air conditioning system services from a requesting system user, the requesting system user composing a plurality of system users; maintaining a data structure in an on board memory of a programmable thermostat, the data structure including a list of time entries, each time entry associated with one of the plurality of system users; and updating the data structure by adding a duration in units of time to the time associated with the requesting system user. According to another aspect of the invention, an apparatus, comprises: a microcontroller; a digital temperature sensor coupled to the microcontroller; a liquid crystal display coupled to the microcontroller; a set of cursor buttons coupled to the microcontroller; an electrically erasable programmable read-only memory coupled to the microcontroller; an upload capable connector coupled to the electronically erasable programmable read-only memory; a real time clock coupled to the microcontroller; and a back up power supply coupled to the real time clock. According to another aspect of the invention, a method, comprises regulating user access to an interactive user interface of a programmable thermostat, each user identified by a personal identification number associated with a user type selected from the group consisting of building owners, maintenance personnel, building tenants, and manufacturers.

According to another aspect of the invention, a method comprises regulating user access to at least one menu of an interactive user interface of a programmable digital thermostat, including: reversibly defining at least one minimum user level required to access the at least one menu including: reading and storing a hierarchical personal identification number associated with a hierarchical user level; permitting hierarchical user access to a user level menu when the hierarchical personal identification number is both valid and associated with a hierarchical user level greater than or equal to a minimum hierarchical user level predefined to be required for access to the user level menu; and reading and storing the at least one minimum user level required to access the at least one menu; and then permitting user access to the at least one menu when a personal identification number entered by another user is both valid and associated with a user level greater than or equal to the minimum user level reversibly defined by the hierarchical user to be required for access to the at least one menu. According to another aspect of the invention, a method comprises defining a multi-stage cooling/heating program of a programmable digital thermostat having an interactive user interface, including: reversibly defining a number of events per day including: reading and storing a hierarchical personal identification number associated with a hierarchical user level; permitting hierarchical user access to a system menu when the hierarchical personal identification number is both valid and associated with a hierarchical user level greater than or equal to a minimum hierarchical user level required for access to the system menu; and reading and storing the number of events per day; and then permitting user access to another menu when a personal identification number entered by another user is valid to further define the multi-stage cooling/heating program. According to another aspect of the invention, a method comprises recovering from a lost personal identification number situation and restoring programmability to a device, including: generating a SEED PIN using the device calculating a KEY PIN using the device and storing the KEY PIN in the device, without displaying the KEY PIN, wherein the KEY PIN is a function at-least-in-part of both the SEED PIN and a serial number associated with the device; sending the SEED PIN and the serial number associated with the device to an authenticating source; recalculating the KEY PIN using the function, the SEED PIN and the serial number at the authenticating source; receiving the KEY PIN from the authenticating source; and entering the KEY PIN into the device to temporarily assign hierarchical access to a user. According to another aspect of the invention, a method comprises a synchronization sequence including: reading a base time from an internal clock at a first time and saving the base time; measuring an elapsed time interval, from the first time to a second time, by counting an external clock using a frequency counter; and then resetting the internal clock to the base time plus the elapsed time. According to another aspect of the invention, an apparatus comprises: an internal clock; an external clock; and a microcontroller coupled to the internal clock and the external clock, the microcontroller including a frequency counter, wherein the microcontroller reads a base time from the internal clock at a first time and saves the base time, wherein the microcontroller measures an elapsed time interval, from the first time to a second time, using the frequency counter, and wherein the microcontroller resets the internal clock to the base time plus the elapsed time.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
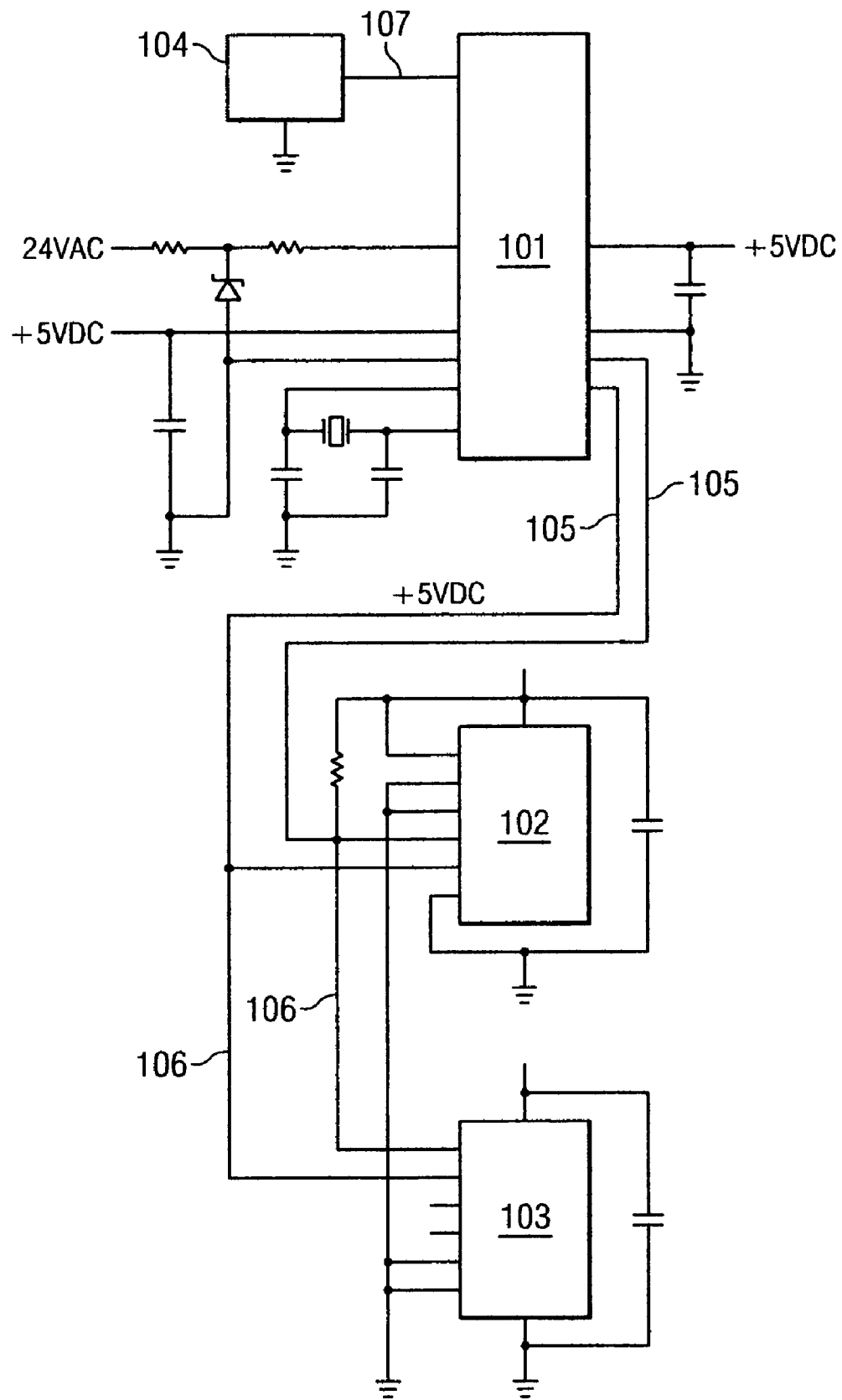
FIG. 1 illustrates a circuit diagram of a temperature sensor, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The context of the invention can include commercial buildings where a plurality of users require HVAC system services. The context of the invention can also include residential buildings.

The invention describes a usage monitoring HVAC control system. The usage monitoring HVAC control system can include a programmable digital thermostat coupled to conventional HVAC equipment, such as compressors and ventilation fans. The programmable digital thermostat can include significant intelligence in hardware and can also include an on-board non-volatile memory coupled to a processor capable of executing software processes. The programmable digital thermostat can be programmed to execute several application-defined processes, and those described herein represent a preferred embodiment of the invention. The programmable digital thermostat can be programmed to execute many other useful processes than those described below.

The invention includes a programmable digital thermostat or a plurality of programmable digital thermostats that are capable of monitoring and regulating room air temperature in an indoor environment. Each of the one or many programmable digital thermostats can control conventional HVAC equipment (e.g. ventilation fans, cooling compressors, and heaters). For convenience, operation of the invention is considered herein to be in an office building environment, however, the same apparatus and methods as described herein can be used in other environments with trivial modifications. The programmable digital thermostats can be configured to regulate room temperature between an upper temperature limit and a lower temperature limit, both of which can be preset to reside between, for example, 50° F. and 90° F., or other limits as deemed ambient. Further, the programmable digital thermostats can be programmed to operate for a preset duration during each business day, presumably when the building is occupied, in the case of an office building during normal office hours. The programmable digital thermostats can regulate room temperature within a preset ambient temperature region during normal office hours. Outside normal office hours, when the building is presumed to be unoccupied, the programmable digital thermostat will no longer regulate room temperature to reside in the ambient temperature region. Instead, the programmable digital thermostat will regulate room temperature to reside in a standby temperature region, the standby temperature region can be determined and preset by building authorities (e.g., between 40° F. and 110° F.). When the building is occupied outside normal business hours and room temperature is maintained by the programmable digital thermostat at a standby temperature, occupants of the building may request additional time periods (e.g. one hour) during which the programmable digital thermostat will resume normal HVAC system operation and maintain room temperature within the preset ambient temperature. The programmable digital thermostat can monitor and accrue such requests for additional periods of normal HVAC system operation. HVAC system usage information can then be downloaded from the programmable digital thermostat and uploaded onto a central billing computer. Thus, building occupants can be billed individually for additional HVAC system services.

Access to HVAC system controls can be restricted by personal identification numbers (PINs) issued to each system user. In one embodiment, there can be five different HVAC control system access levels. The number of different access levels can be chosen as required. Each user can be given a PIN that is recognized by the programmable digital thermostat as belonging to one of the five access levels. The programmable digital thermostat allows those identified as building tenants to order additional periods of ambient temperature. Users identified as building owners or maintenance personnel are granted further system access. Building owners can change ambient temperature setting and hours of normal system operation. If building tenants order additional periods of ambient temperature, the system usage data, i.e., the duration of time for which ambient temperature is ordered, is recorded in the local memory of the programmable digital thermostat. Hours of additional system usage for each user is recorded and accrued according to each user's PIN. The usage data can then be transferred from the local memory of the programmable digital thermostat to a central billing computer via a hand-held personal data assistant (PDA) or via wireless transmission or via hardwire connection. Usage data can be transferred into a spreadsheet format on the central billing computer. The spreadsheet thus created can contain information such as user PIN and total additional ambient temperature hours ordered.

A calendar can also be included in the local memory of the programmable digital thermostat. The calendar can be preset to indicate holidays and weekends, i.e., longer periods for which the programmable digital thermostat can revert to the standby temperature setting.

HVAC system usage data can be collected from the local memory of each programmable digital thermostat via either a hand-held PDA or a wireless transmitter. The wireless transmitter can be contained within the thermostat module. The thermostat module can include a universal serial bus (USB) interface for data download to a hand-held PDA. Usage data can then be uploaded to a central billing computer. The invention can include apparatus and methods to convert the usage data stored in the programmable digital thermostat to a spreadsheet format that can be displayed on the central billing computer. Use of a wireless transmitter can also be extended to allow users to order ambient temperature over a wireless medium.

Referring to FIG. 1, a temperature sensor control circuit is shown. A voltage monitor 104 can be coupled to a microcontroller 101 via a bus 107. The voltage monitor 104 includes a 5 VDC power supply to energize the circuit of FIG. 1. An electrically erasable programmable read-only memory (EEPROM) memory board 102 can be coupled to the microcontroller 101 via a bus 105. An electronic temperature sensor 103 can be coupled to the EEPROM memory board 102 via a bus 106.

Still referring to FIG. 1, an electronic temperature sensor 103 can measure room temperature at regular intervals. During each room temperature measurement, the electronic temperature sensor 103 can send temperature data to an EEPROM memory board 102 via a bus 106. The temperature data can be stored in the EEPROM memory board 102, and a copy of the temperature data can be transmitted to the microcontroller 101 via a bus 105. The microcontroller 101 can read the temperature data and send signals to HVAC units (not shown) to regulate room temperature at a programmed level. The circuit of FIG. 1 can be used to implement a standard temperature monitor and control system.

Figure 2A:
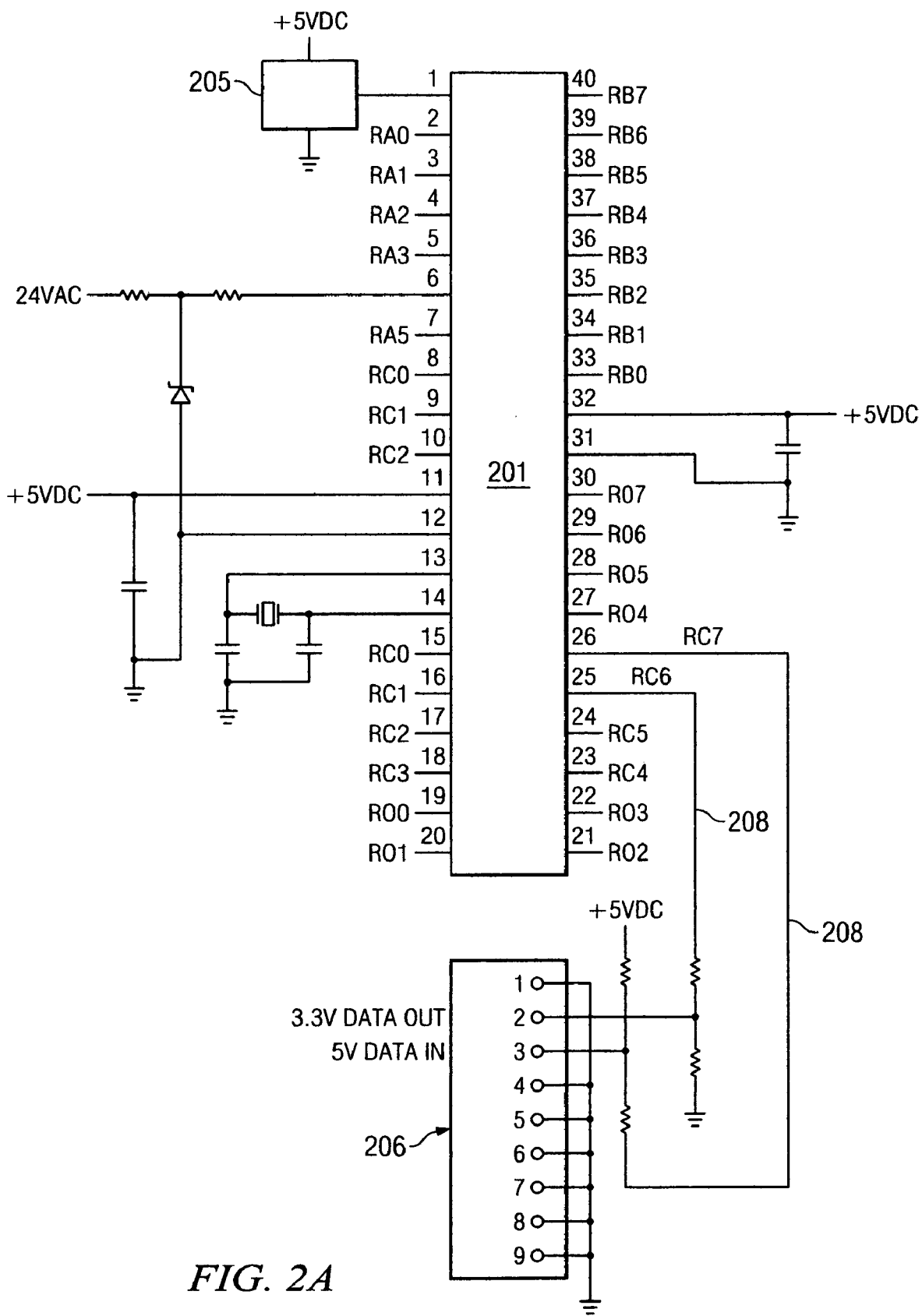
FIG. 2 illustrates a circuit diagram of a control system, representing an embodiment of the invention.
Figure 2B:
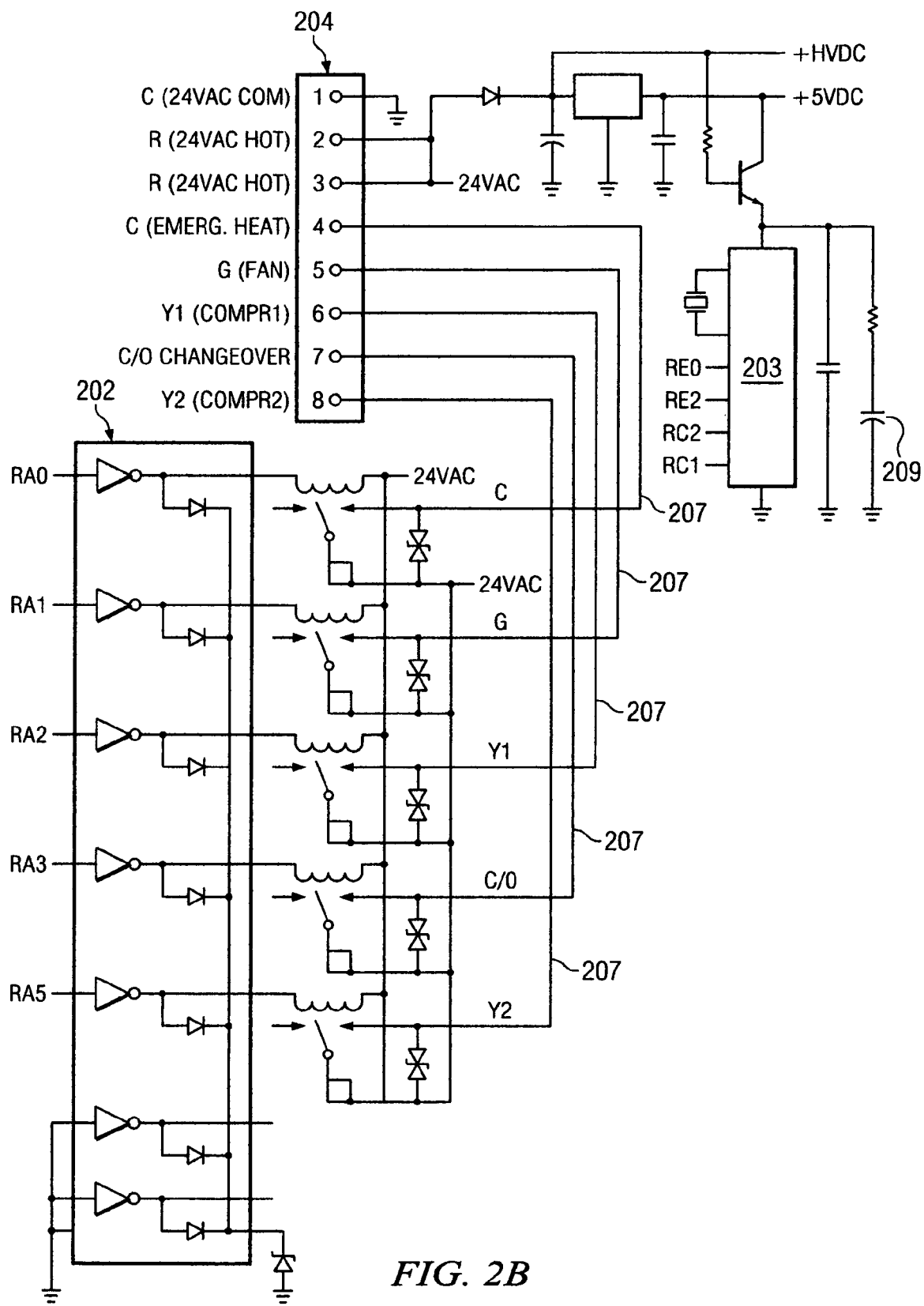

Referring to FIG. 2, a circuit diagram of a HVAC control system is shown. Several terminal couplings are not shown in the circuit diagram for increased clarity. Terminal couplings, unless implicitly shown as hardwire connections in the circuit diagram, are indicated by reference letters at each terminal, wherein like reference letters at two terminals indicate that they are coupled. A voltage monitor 205 can be coupled to a microcontroller 201 via a bus. The microcontroller 201 can be coupled to a relay driver 202 (terminal connections are not shown). The relay driver 202 can be coupled to a terminal block 204 via a plurality of buses 207. The terminal block 204 can be coupled to various HVAC equipment such as a fan, a compressor, an emergency heating unit, etc. A real time clock 203 can be coupled to the terminal block 204. A back up power capacitor 209 can be coupled to the real time clock 203. A serial interface 206 can be coupled to the microcontroller 201 via a bus 208.

Still referring to FIG. 2, current can be supplied to the entire circuit by a voltage monitor 205. The voltage monitor 205 rectifies and steps down 24 VAC (standard HVAC power supply) to 5 VDC which is suitable for driving electronic circuits. A microcontroller 201 can receive temperature data from a temperature sensor (circuit of FIG. 1) and send corresponding heating and/or cooling instructions to HVAC equipment via a relay driver 202 and a terminal block 204. A real time clock 203 can be responsible for maintaining a timing mechanism, allowing the microcontroller 201 to maintain HVAC system operation at different temperatures at different times, such as office hours and after hours, weekends, and holidays. A back up power capacitor 209, supplies power to the real time clock 203, in case power supply is momentarily interrupted. HVAC system usage data that can be stored in system memory can be accessed by the microcontroller 201 and uploaded to a hand held PDA via a serial interface 206. The HVAC system usage data can further be uploaded onto a central billing computer from the hand held PDA to allow individual users to be billed for HVAC services.

Figure 3:
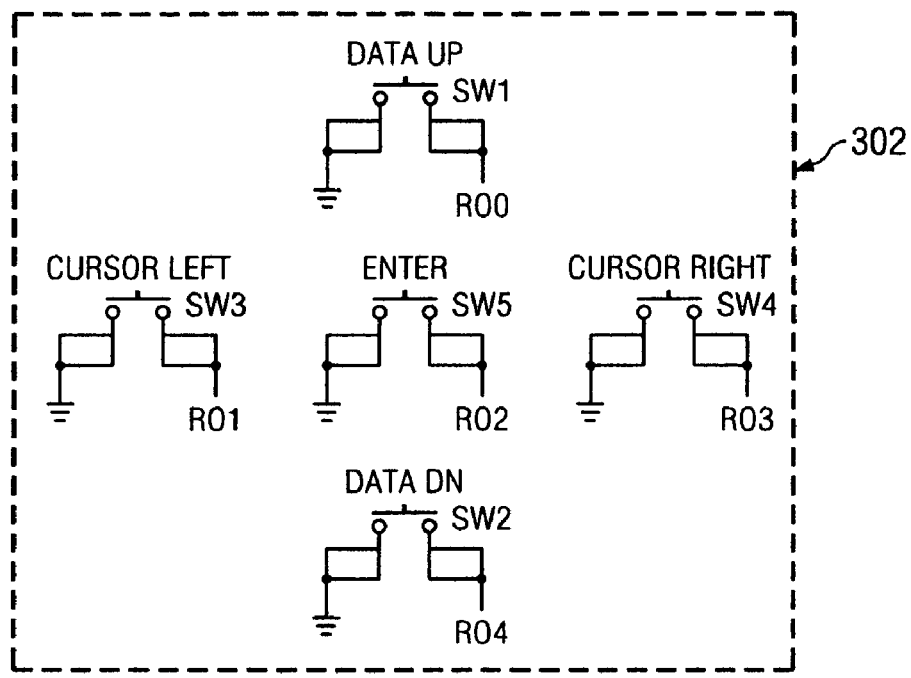
FIG. 3 illustrates a circuit diagram of a display control, representing an embodiment of the invention.
Figure 3:
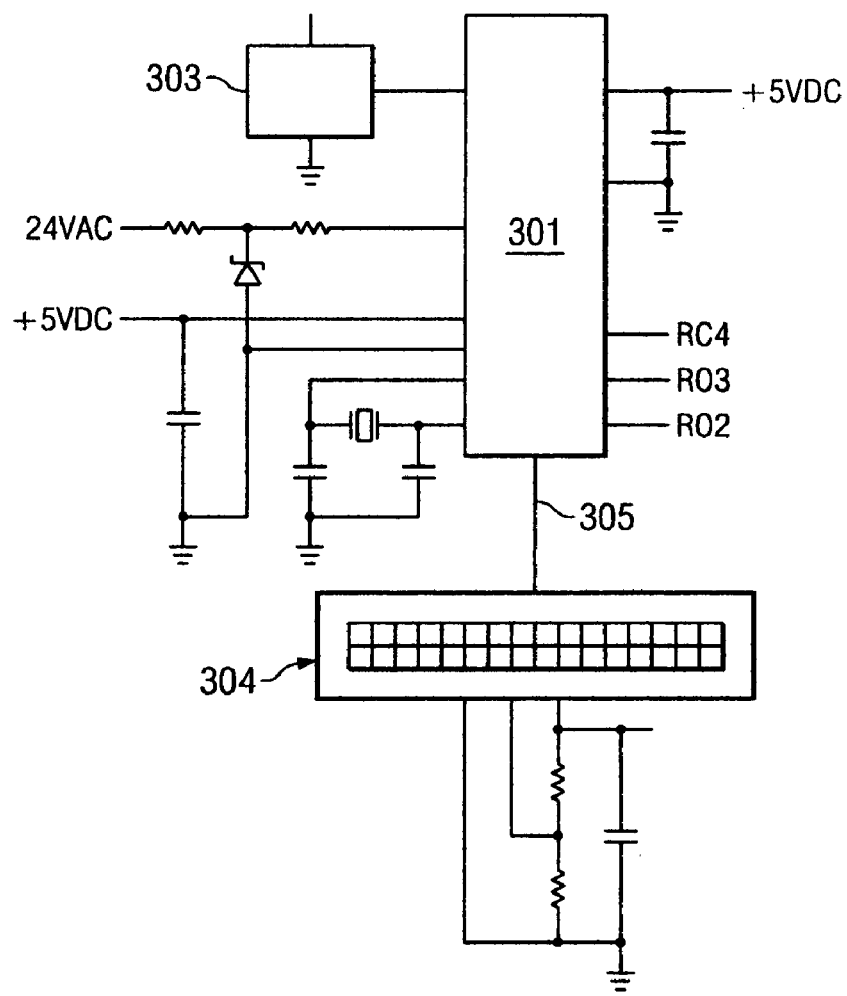

Referring to FIG. 3, a display control circuit is shown. Several terminal couplings are not shown in the circuit diagram for increased clarity. Terminal couplings, unless implicitly shown as hardwire connections in the circuit diagram, are indicated by reference letters at each terminal, wherein like reference letters at two terminals indicate that they are coupled. A microcontroller 301 can be coupled to a voltage monitor 303. A set of cursor buttons 302 can be coupled to the microcontroller 301. A liquid crystal display (LCD) 304 can also be coupled to the microcontroller 301 via a bus 305. A 2×16 LCD is shown in FIG. 2. Other types of LCD displays can also be used in the configuration shown.

Still referring to FIG. 3, a start menu can be presented to users via a liquid crystal display 304. Information displayed on the liquid crystal display 304 can be processed by a microcontroller 301. Such information can include a calendar, a personal identification number prompt, temperature readings, and HVAC system usage data. Users can key in their PIN using a set of cursor buttons 302 that are housed on a thermostat casing (see FIG. 4). Once a user PIN is entered, the microcontroller 301 displays subsequent menus to the user via the liquid crystal display 304. The subsequent menus that are displayed can depend on user type. User types can include tenants, building owners, maintenance personnel, and manufacturer. The microcontroller 301 can access an electrically erasable programmable read-only memory to associate each entered user PIN to a user type. Depending on the user type, users can order additional HVAC services using the set of cursor buttons 302.

Figure 4:
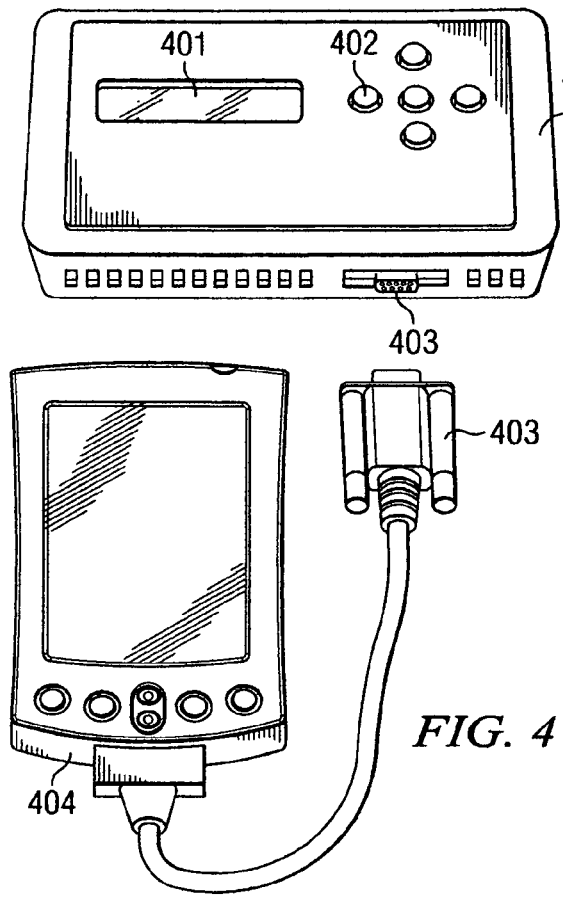
FIG. 4 illustrates a surface view of a usage monitoring HVAC control system, representing an embodiment of the invention.

Referring to FIG. 4, a usage monitoring programmable thermostat with HVAC system usage data upload capabilities is shown. A wall mounted thermostat casing 405 is shown. The surface of the thermostat casing 405 can include a liquid crystal display 401 and a set of cursor buttons 402. The thermostat casing 405 can also include a serial port 403. Also shown in FIG. 4 is a hand held PDA 404 that can be used to download HVAC system usage data from memory housed within the thermostat casing 405 via a serial port 403.

Figure 5:
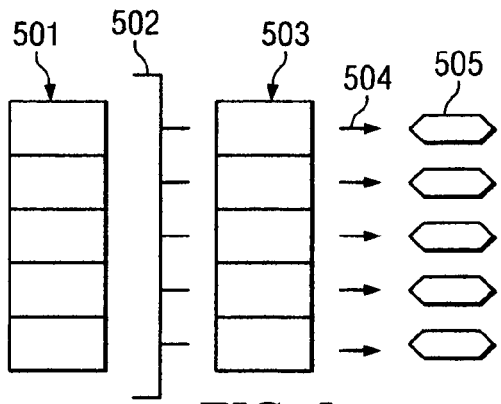
FIG. 5 illustrates a data structure that can be stored in electrically erasable programmable read-only memory, representing an embodiment of the invention.

FIG. 5 depicts a software subsystem including a data structure including a list of PINs, each of which can be associated with a user type, wherein each PIN represents an HVAC system user. Each user of the HVAC system can be identified by a PIN. PINs for all users of the HVAC system can be stored in EEPROM that is housed in a programmable digital thermostat. FIG. 5 shows a method of software management that can be used with the invention to implement PIN restricted HVAC system control access. Each user PIN can be stored in EEPROM as an entry in a data structure of PINs 501. The illustration depicts a simple linked list as a preferred algorithm for implementing the data structure of PINs 501. It should be apparent to those skilled in the art that other algorithms may be used to implement the data structure. Alternative algorithms can include doubly linked lists, binary trees, queues, hashes, stacks, heaps, tables, and dequeues. The data structure of PINs 501 can then be processed by a software filter 502. The software filter 502 can associate each PIN in the data structure of PINs 501 with exactly one of a plurality of user types. Therefore, each user PIN can be associated in software with exactly one user type. User types can be stored in a secondary data structure 503 in EEPROM. There are several methods by which each user PIN can be associated with a user type in the software filter 502. A simple method would be to give all PINs associated with a single user type a common digit. For example, all PINs containing a "0" in a least significant digit can be associated with the user type of building owners. In this case, a very simple software filter 502 can be designed to associate all PINs ending in "0" with the user type of building owners. Of course, there are other more elegant methods that can be used to associate a user PIN with a user type classification. Once all the PINs in the data structure of PINs 501 have been associated with a user type by the software filter 502, all the PINs associated with each user type can be presented with access to all privileges associated with that particular user type. Privileges associated with each user type can be stored in an auxiliary data structure 505 that can be passed by reference 504 to each user type within the secondary data structure 503. Thus each user can be presented with privileges associated with their user type, characterized by their PIN. These privileges can be presented to users via an interactive display as indicated in FIG. 4. Of course, alternative methods can easily be used to implement PIN restricted HVAC system control access. For example, a lookup table containing unused PINs can be stored locally in EEPROM and issued to users at random. When each new PIN is issued, a microcontroller can determine the user type the PIN is being issued to, and associate that particular user type to the newly issued PIN in memory.

Figure 6:
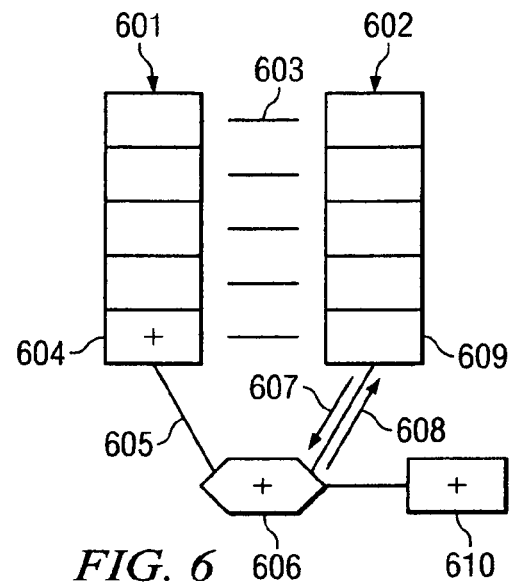
FIG. 6 illustrates a software subsystem, representing an embodiment of the invention.

Referring to FIG. 6, a schematic diagram of data structures and software processes associated with the invention is shown. In particular, FIG. 6 shows a method by which HVAC system usage data can be accrued and stored in EEPROM housed in a programmable digital thermostat. Of course, the methods described herein are given by way of example only and other implementations are possible. When a user orders additional HVAC system services, the user can enter their PIN on a keypad housed on the programmable digital thermostat, and subsequently request HVAC services. In software, the user's PIN can be stored as an entry 604 in a data structure of PINs 601 (see also FIG. 5). When the user requests additional HVAC services, a flag can be raised in the data structure of PINs 601, under the user's specific PIN entry 604. In FIG. 6, such a flag can be denoted by a "+" sign. A microcontroller 606 can detect flags in the data structure of PINs 601 via a internal software thread 605. Once the microcontroller detects the presence of a flag requesting additional HVAC services, it directs HVAC equipment such as compressors, fans, etc. to resume normal operation rather than remain in a standby mode. When the user completes use of additional HVAC services, the flag can be removed from the data structure of PINs 601. When the microcontroller detects the removal of the flag, it accesses a system clock 610 for information related to the additional HVAC services ordered by the user. The microprocessor then accesses a data structure of historical HVAC system usage data 602. The data structure of historical HVAC system usage data 602 contains accrued HVAC system usage data for each user pin belonging to the data structure of PINs 601. Each entry in the data structure of PINs 601 can be pointed by reference 603 to an associated entry in the data structure of historical HVAC system usage data. A copy of the user's historical HVAC system usage data 609 can then be copied to the microcontroller 606 via a download software thread 607. The microcontroller 606 can then update the user's historical HVAC system usage data by adding to it the data passed to it by the system clock 610. Then, the microcontroller 606 can write the new value for the user's historical HVAC system usage data to the user's entry 609 in the data structure of historical HVAC system usage data 602 via a upload software thread 608. Thus the data structure of historical HVAC system usage data 602 is dynamic and can be updated automatically by the software subsystem described above. The data structure of historical HVAC system usage data 602 along with the data structure of PINs 601 and corresponding reference pointers 603 can all subsequently be uploaded from EEPROM on board the programmable digital thermostat to a central billing computer, where users can be billed for additional HVAC services according to their PIN. A potentially more efficient method of dynamically accruing and storing historical HVAC system usage data for each user can involve utilizing temporary storage systems, such as an auxiliary memory unit, in conjunction with the microcontroller 606 and EEPROM. Instead of copying and downloading historical HVAC system usage data from the data structure of historical HVAC system usage data 602 to the microcontroller 606, a dynamic copy of the data structure of historical HVAC system usage data 602 can be stored and automatically updated in the auxiliary memory unit.

Figure 7:
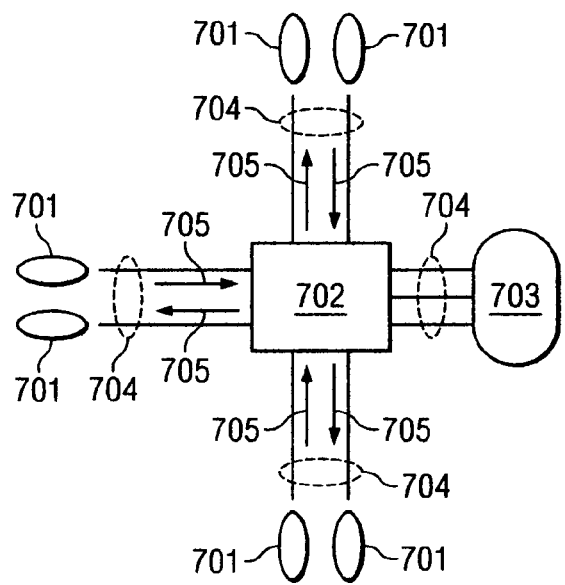
FIG. 7 illustrates a usage monitoring HVAC control system, representing an embodiment of the invention.

Referring to FIG. 7, a usage monitoring HVAC control system is shown. A programmable digital thermostat with on board memory 702 can be coupled to a plurality of user nodes 701 via interconnects 704. The interconnects 704 can include hardwire connections, wireless connections, and indirect connections, such as via a hand held PDA or auxiliary computer. Boosters 705 can also be placed on the interconnects to improve communication between the user nodes 701 and the programmable digital thermostat 702. The programmable digital thermostat 702 can be coupled to a plurality of HVAC equipment such as compressors, heaters, and air conditioners (not shown). A central billing computer 703 can be coupled to the programmable digital thermostat 702.

Still referring to FIG. 7, user nodes 701 can be used to request periods of HVAC service via the programmable digital thermostat 702. The programmable digital thermostat 702 can direct HVAC equipment to operate according to user requests. The programmable digital thermostat 702 can accrue and store information regarding all such user requests over a period of time, for example a month, after which it can upload the information to a central billing computer 703. The central billing computer 703 can process this information and subsequently bill individual users depending on the amount of time for which they requested HVAC services.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of an embodiment of the invention, and thus can be considered to constitute preferred modes for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of an embodiment of the invention.

An embodiment of the invention can comprise a system that includes one or more programmable thermostat(s). The system can include the following elements: one or more programmable digital thermostat(s) (PDTs) for installation in environmental areas to be controlled and monitored; one or more personal computers (e.g., IBM-compatible) and/or hand held personal data assistants used as a Data Collection Devices (DCDs) to read data from the programmable digital thermostats; and one or more software program(s) that allow the data collection device(s) to upload and download data to/from the programmable digital thermostat(s).

The programmable digital thermostat is designed to replace existing thermostats while adding new functionality to control and monitor energy usage. The programmable digital thermostat uses PINs to prevent unauthorized persons from changing the thermostat settings, and saves into non-volatile memory a record of every change in setting that is made, recording up to 1,000 changes before previous records are overwritten.

The programmable digital thermostat can be configured via multiple menus having controlled access. An authorized user can set different access levels (0-9) for different menus. The different access levels can be set via a SET MENU LEVELS menu Both heat and cool temperature set points can be programmed for two or four events per day for each day of the week. The selection of the number of available events per day can be made via a SYSTEM menu. Minimum and maximum program temperatures can be in the range from 50 F to 95 F.

At any time, authorized persons can override programmed temperature settings up to a programmable limit (±0 F to ±9 F) for a predetermined, but not programmable duration. Only when outside working hours, authorized persons can override programmed settings for a programmable duration, causing the thermostat to control the environment to predetermined settings for working hours. The two features described in this paragraph are separate and independent. Authorized persons can override automatic fan operation, forcing the fan to continuous "on", for a programmable duration from 2-9 hours.

Up to 12 specific dates in a year, "holidays", may be programmed in advance to provide a programmable standby environment on those dates, with the same environment for all dates.

A 2 line, 16-character per line, reflective, alphanumeric liquid-crystal-display (LCD) allows easy programming and clear display of parameters. The display is not lighted.

Settings and a log of "actions" are kept in non-volatile memory and are not lost upon power failure. Override data are stored in volatile RAM and are lost upon power failure. No dipswitches are used. All user-changeable parameters are settable via the control panel. The Actions Log records at least 1000 "actions" before automatically overwriting the oldest actions.

All electronics are powered by 24 VAC supplied by the external HVAC equipment. No battery is required. For normal operation both the common and return leads from the system transformer should be connected to the thermostat. Limited operation of single-stage split (separate heat/cool) systems only is available for systems that do not provide the "common" transformer connection by "stealing" current through either the W1 or Y1 relays (whichever is not currently energized).

A real time clock integrated circuit with crystal keeps time. A large capacitor (double-layer) stores energy during normal operation to sustain clock operation for at least 72 hours when AC power is lost. As with all crystal-controlled clocks, there will be some error in the clock rate and the clock will need periodic resetting for best accuracy. For installations that have a dependable AC power source (i.e. few power outages) with the frequency of that source closely controlled (virtually all of the U.S.), the SYNCHRONIZE CLK menu provides a hardware, firmware and/or software for overcoming this clock drift. See the description of that menu for details.

The programmable digital thermostat can interface with an IBM-compatible PC via a bi-directional RS-232 port to retrieve the stored usage data or to download/upload operating parameters.

Up to 10 PIN's (Personal Identification Numbers) may be assigned to control access to parameter-changing menus.

Operation is restricted to Fahrenheit degrees.

The programmable digital thermostat can support 5 modes of operation: Off, Standby, Heat, Cool, and Auto.

Anticipation is adaptive and automatically set. Differential is programmable in 0.25 F increments from ±0 F to ±2.25 F.

A Copy function facilitates entering program data for days having similar programs.

Figure 10:
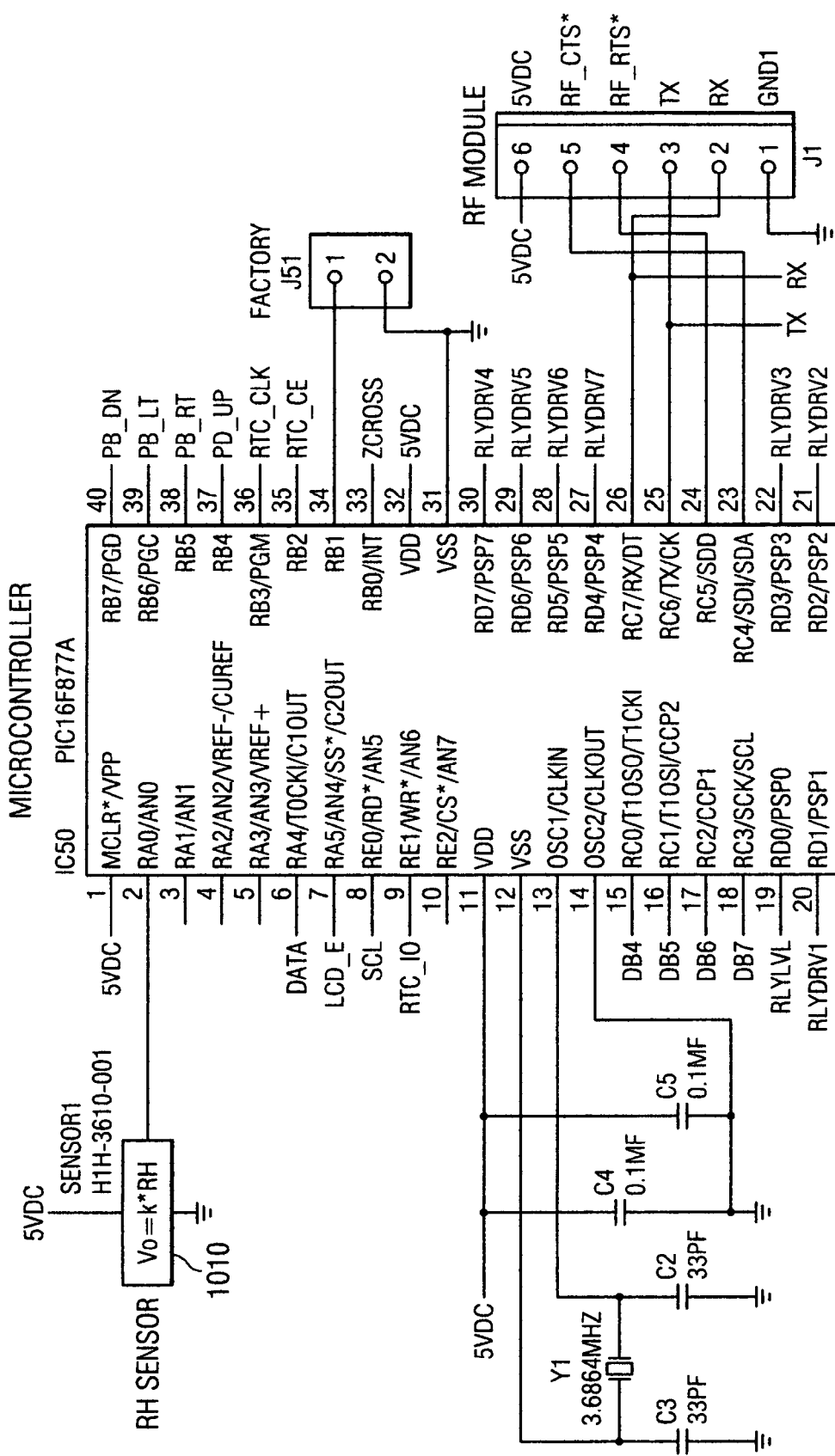
FIG. 10 illustrates a circuit diagram of a portion of a programmable digital thermostat including a microcontroller, representing an embodiment of the invention.
Figure 11:
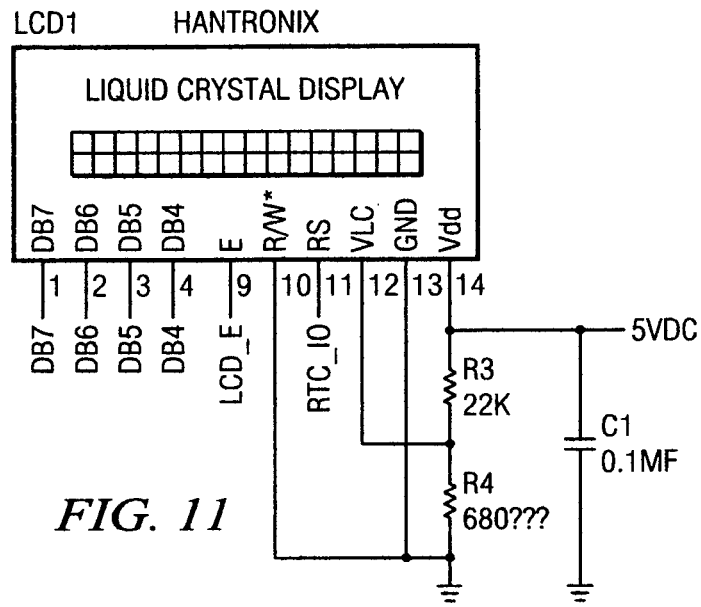
FIG. 11 illustrates a circuit diagram of a portion of a programmable digital thermostat including a liquid crystal display, representing an embodiment of the invention.

Referring to FIG. 10, a socketed, reprogrammable, FLASH-ROM based microcontroller 1020 allows for easy code updating. This microcontroller 1020 itself provides EEPROM storage that is used for parameter storage and FLASH memory that is used for program and Actions Log storage.

An optional "Remote Sensor" assembly allows placement of the temperature sensor up to 75-feet (cable length) away from the programmable digital thermostat.

An optional, internal relative humidity (RH) sensor is available to control humidity by choice of low or high fan speeds during a cooling cycle.

Programmable alerts (0-12 months) remind the user to check humidifiers and air filters.

The programmable digital thermostat can support both type O and type B changeover valves for heat pumps.

The programmable digital thermostat can control up to 3 stages of heating and 2 stages of cooling for both split and heat pump systems. Alternatively, the $3^{rd}$ stage of heating may be configured to call an alternate heating system for emergency heat.

The programmable digital thermostat can be housed in a 2-piece, snap-together, molded plastic case. The back half of the case is to be permanently attached to a wall, with the HVAC wires attaching to screw-terminals within the back half. The thermostat printed circuit board is attached to the removable cover of the case. Electrical connections are automatically made when the front half is snapped onto the back half of the case. The LCD and control switches are accessible from the front of the unit through the cover. A hot-stamped logo is applied to the front cover to provide thermostat identification. No auxiliary cover is provided to hide the LCD, control switches, or labeling.

To prevent too-rapid cycling of HVAC equipment during times of power interruption, the programmable digital thermostat can power up with a time delay in effect; the length of the delay is the same as that set with the MIN ON/OFF TIME menu. During this delay, thermostat control operation is inhibited, but the user interface remains active. The user can implement the menus to view and change parameters but the thermostat will not begin controlling the external HVAC equipment until the delay expires.

When the programmable digital thermostat is set to any Menu other than "Main Menu", control operation is interrupted. During this time all relays will remain in whatever state (on or off) they were in when the Main Menu was exited. After a period of inactivity (no buttons pressed) of approximately one minute, the system will reset itself to the "Main Menu" and normal control will resume. It is recognized that a skillful and devious user could cause the relays to remain in this state indefinitely by continuing to press a button oftener than once a minute without returning to the Main Menu.

Operation is based upon selecting a Menu from those listed below using the "up" and "down" buttons after the cursor has been placed in the leftmost position using the "left" button. The contents of the display vary with each Menu. Note that the ability to view and use each Menu is restricted to those persons having appropriate PIN Levels. The following is a list of the menus indicating in parentheses the relevant paragraph to see for further information. The menus are listed in the order they will appear using the "down" button, progressing from the MAIN menu.

Menus
MAIN
ENTER PIN
ADD WORK HRS
ADD FAN ON HRS
NUDGE LIMIT
CLOCK
MODE
PROGRAM
STANDBY TEMPS
STANDBY DAYS
SYNCHRONIZE CLOCK
SYSTEM
DIFFERENTIAL
FAN MODE
MIN ON/OFF TIME
NEXT STAGE ERROR
TEMP SENSOR CAL
SENSOR LOCATION
USE LOW FAN ABOVE
USE EMERGENCY HEAT?
HUMIDIFIER ALERT
AIR FILTER ALERT
ASSIGN PINS
SET MENU LEVELS
SERIAL NUMBER Using the Display to Select Menus and Parameter Values:

Move the cursor to the leftmost display character using the "Left" button; this is the "home" position. Then use the "Up/Down" buttons to select the desired Menu. The display content will change as described in the Menu descriptions in following sections. Within a menu the "Left/Right" buttons are then used to place the cursor at the position of data to be changed. After placing the cursor, use the "Up/Down" buttons to select the desired data value.

Saving Data Changes:

For all menus that reference non-volatile data, the data is saved in RAM alone as the displayed values are changed and is copied to EEPROM only when the programmable digital thermostat is returned to its MAIN menu. During the copy to EEPROM, every data item is checked for change; if a change has occurred (since the last copy to EEPROM), an "action" is recorded in FLASH memory to document the change. For all menus that reference volatile data, the data is saved in RAM alone as the displayed values are changed; this data is not copied to EEPROM. Non-volatile data includes the currently active PIN, the duration of ADD WORK HRS, the duration of ADD FAN ON HRS, and the amount of "nudge" currently applied to the set points. Clock data (date/time) are not stored to EEPROM but do have some non-volatility due to the backup power provided for the clock.

The following sections describe each Menu and the associated display. In the "Display" tables, the top row shows the display character number and the next two rows show a typical display. The "TOP" and "BOTTOM" lines of the display are labeled. Below each "Display" table is a "Parameters" table showing the parameters and values that may be displayed at specific locations identified by line (TOP/BOTTOM) and character number (01-16). A "Description" section provides further information for each menu.

Which Menus are Displayed and the Order of Display:

Whether a particular menu is displayed or not depends on the system configuration that has been set using the SYSTEM TYPE menu, the PIN Level that has been granted using the ENTER PIN menu, and the current time. See also the SYSTEM TYPE and ASSIGN PINS menu for further information. When menus are displayed, they are displayed in the order shown in section 2.3.2 above.

Automatic Return to Main Menu

If no buttons are pressed for a period of approximately 60 seconds, the thermostat will automatically reset itself to the Main menu and normal operation will resume. If at the time of automatic return, the user has left the cursor within a menu (i.e. not returned to the leftmost home position), changed data may or may not be retained (depending on the specific menu) after the automatic return. Therefore, it is advised that the user manually return the programmable digital thermostat to the Main menu when the user has finished using the other menus.

Measuring Time

Although the internal clock may be set to the nearest minute via the CLOCK menu, all other clock and time operations are based on a 15-minute interval time system (4 intervals/hour) beginning at midnight. Some examples of internal time are:

Midnight (12:00 AM)=0 time
12:14 AM=0 time
12:15 AM=1 time
12:29 AM=1 time
12:30 AM=2 time
01:00 AM=4 time
08:00 AM=32 time
08:10 AM=32 time
11:59 PM=95 time The coarseness of this time system leads to some non-obvious results. For example, if the ADDHRS menu is used to override temperature set points for 2 hours beginning at 5:10 AM (20 time), then the override will automatically terminate at 7:15 AM (when time becomes greater than 20 time+8 time; that is, at 29 time), a duration of 2 hours and 5 minutes.

MAIN Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | H | E | A | T |  |  | 6 | 8 | - | 7 | 8 | F |  | 7 | 8 | F |
| BOTTOM | _ | S | T | A | T | - | # |  | C | K |  | H | U | M | I | D |

Parameters:

| Display Location | Parameter | Allowed Values |
|---|---|---|
| TOP-01 | Mode | OFF, STBY, HEAT, COOL, AUTO |
| BOTTOM-02 | Active operation and stage | COOL-2, COOL-1, C-IDLE, H-IDLE, HEAT-1, HEAT-2, HEAT-3, H-EMRG |
| TOP-07 | Temperature Set Range | Min Temp-Max Temp, 50-95 F, as set in PROGRAM menu. May be "Nudged" +/−. |
| BOTTOM-09 | Alternating alerts | CONT FAN, CK FILTER, CK HUMID, or blank in sequence at 5-sec intervals. |
| TOP-14 | Current Temp | 50-95 F. |

Description:

This menu is available to all users at all times.

This menu is shown at power-up. The thermostat should be set to this Menu for normal operation.

In all other menus, if no buttons are pressed for a period of 60 seconds, the thermostat will automatically reset itself to this Main menu, with the cursor at the home position, and normal operation will resume.

See the Description of the AIR FILTER ALERT and HUMIDIFIER ALERT menus for details on setting check intervals and clearing the alerts. The alerts remain active until cleared.

If the user has an appropriate access level (see MENU LEVELS menu), the cursor may be moved to the "nudge" (TOP-07) position. At that position the UP/DN buttons may be used to raise or lower (i.e. "nudge") both the cool and heat set points simultaneously, within a ±range set with the NUDGE LIMIT menu. This action temporarily overrides the limits set with the PROGRAM or STANDBY TEMPS menus. The min/max limits of 50 F/95 F are enforced. The override will expire when the current time becomes "standby time" (rather than normal or "work hours"), when power is lost, or when the day ends (midnight). An Action is not recorded to FLASH memory when the "nudge" function is used.

The cursor should be at the home position to advance to the next menu.

ENTER PIN Menu
Display:

|     | 01 | 02 | 03 | 04 | 05 | 06 | 07 | 08 | 09 | 10 | 11 | 12 | 13 | 14 | 15 | 16 |
|-----|----|----|----|----|----|----|----|----|----|----|----|----|----|----|----|----|
| TOP |    | E  | N  | T  | E  | R  |    | P  | I  | N  |    |    |    |    |    |    |
| BOTTOM | _ | # | # | # | # | # |    |    |    |    |    |    |    |    |    |    |

Parameters:

| Display Location | Parameter | Allowed Values |
|------------------|-----------|----------------|
| BOTTOM-02 | PIN Value | 00000-65535 |

Description:

This menu is available to all users at all times.

A user may enter a 5-digit PIN that has been assigned a PIN LVL (level) using the ASSIGN PINS menu. Each menu is assigned a specific minimum PIN LVL for access; if a user enters a PIN with a suitable PIN LVL assigned, the user will be able to access the menu. See the ASSIGN PINS menu for more information on PINS and PIN LVL's. See the SET MENU LEVELS menu for information about assigning PIN LVL's to specific menus.

If an unassigned PIN is entered and saved (by moving the cursor to home), the message "INVALID, WAIT!" will be displayed and the thermostat will not respond to further button presses for a period of 15 seconds. This feature is intended to discourage persons from trying to discover a valid code by trying successive numbers. It should be noted that a determined user could ultimately discover all PIN's by the method of trying each number from 00000-65535 in order, waiting 15 seconds after each invalid entry.

The thermostat will force entered values greater than 65535 to 00000 and thereby deny access to controlled menus . . . unless 00000 has been assigned a PIN Level greater than 1 (not recommended).

If a valid PIN is entered and the cursor moved to the "home" position, the user may then use the "up" and "down" buttons to navigate among the menus. If no button is pressed for 1 minute, operation will automatically revert to the Main menu and the PIN will be canceled, allowing access only to Level 0 menus. A PIN can be canceled only by this automatic timeout or by using this menu to set an invalid PIN.

An Action is recorded to FLASH memory whenever a PIN is entered, whether the PIN is valid or invalid.

Special Procedure to be Used When PIN's are Not Known

A user could lose access to the ASSIGN PIN and MENU LEVELS menus, both of which require a LVL of 9 for access, by (1) failing to assign a LVL 9 to at least one PIN or (2) forgetting or losing the value of the PIN (or PIN's) that has LVL 9 access. To recover from such a situation, the following scheme is implemented:

To force LVL 9 when appropriate PIN's are not known, the user should contact the vendor for instructions that will be similar to the following.

1. Read and understand these instructions completely before proceeding. During contact with the vendor, it will be most convenient if the user is near the programmable digital thermostat to perform tasks as instructed by vendor.
2. The procedure described will temporarily assign LVL9 access to the user. With that temporary access the user should use the ASSIGN PINS menu to permanently assign LVL9 access to at least one PIN. Review use of the ASSIGN PINS menu before proceeding
3. Note that the programmable digital thermostat will automatically cease current operation and revert to MAIN menu operation if no button is pressed for one minute. Once user begins the procedure below, user should press buttons often enough that this automatic timeout does not activate; otherwise user should repeat the procedure from the beginning until user successfully complete the procedure without a timeout.
4. Contact vendor, identify user and user's programmable digital thermostat (e.g., by Serial Number).
5. With the ENTER PIN menu, using the UP/DN/RT/LT buttons display the PIN "45678". Do not return the cursor to the left home position. Instead, once the correct PIN is displayed, hold the RIGHT button depressed until the display changes to a different PIN (the SEED PIN); this may take up to 15 seconds. As soon as the new PIN is displayed, release the RIGHT button. (At this time the programmable digital thermostat will calculate and save in RAM, but not display, an encrypted version of this SEED PIN as the final KEY PIN.)
6. Tell vendor the value of the displayed SEED PIN. The automatic 1-minute timeout is bypassed while the SEED PIN is displayed; user may leave the PIN displayed as long as desired (although all other functions of the programmable digital thermostat are unavailable during this time!). This SEED PIN value will remain fixed until the user actually uses the final KEY PIN described below. During that successful use of the KEY PIN, the programmable digital thermostat will change the SEED PIN value. The user cannot set the SEED PIN, preventing its reuse. Alternatively, not changing the SEED PIN right away, or at all would enable reuse of the KEY PIN either for a controlled time period or indefinitely.

7. Vendor will then provide user with a final KEY PIN (The final KEY PIN was calculated and saved as described above.) that will remain valid until the automatic 1-minute timeout occurs or until the programmable digital thermostat loses power. If user enters an invalid KEY PIN user should repeat this procedure from the beginning. Before entering the KEY PIN (in place of the displayed SEED PIN), the user should review their intent since the automatic 1-minute timeout will again be in effect once the user enters the PIN. Specifically, does the user wish to (1) find the missing or forgotten PIN information, (2) assign a LVL 9 to an existing PIN, or (3) assign a new PIN with LVL 9? When ready, simply enter the KEY PIN in place of the already displayed SEED PIN. Then move the cursor fully to the left to its home position. The programmable digital thermostat will automatically display the ASSIGN PINS menu. The user will have LVL 9 access until (1) the automatic 1-minute timeout occurs, or (2) power is lost. It is important to remember the user, as well as anyone else, will continue to have LVL 9 access until the user either (1) allows the 1 minute idle timeout to occur or (2) the user implements the ENTER PIN menu to enter a PIN having some other access LVL.

8. If for any reason, the user fails to successfully achieve their intent, the user should contact vendor again as the KEY PIN provided to the user will work only one time!

The programmable digital thermostat creates and maintains in non-volatile memory a non-repeating "key". This key and the programmable digital thermostat serial number are used to encrypt PIN's. After each successful use, the key is automatically changed; of course the Serial Number remains unaltered.

Vendor will be provided with a mathematical formula for encrypting PIN's. It is the responsibility of vendor to protect this formula against knowledge by unauthorized personnel!

The KEY PIN could also use (1) the date/time values of the internal clock or (2) a fixed number other than a serial number embedded within the code of the thermostat or (3) a variable number derived from any or all of the parameter values set within the thermostat. That is, the KEY PIN could use any identifying information predetermined or derived from the code or memory or other hardware devices of the thermostat.

ADD WORK HRS Menu
Display:

Parameters:

| Display Location | Parameter | Allowed Values |
|---|---|---|
| BOTTOM-02 | Added hours of control to "work temperatures" | 2 through 9 |

Description:

This menu is available only to authorized users, only when EV/DY=2 in the SYSTEM menu, and only during Standby Hours.

When available (see proceeding), this menu provides an override to the temperature set points entered via the PROGRAM menu. The first programmed time-event of each day is taken to be the start of "work hours" and the programmed temperature range for that time-event is taken to be "work temperatures." The ADD WORK HRS menu forces the system to control to "work temperatures" during non-work hours. The override begins at the time the user sets a duration via this menu and ends when (1) the duration has expired, (2) the current time reaches midnight, (3) a change is made in either the MODE or SYSTEM menus, (4) the current time changes to "work hours", or (5) there is loss of power. The programmable digital thermostat does not prevent entry of a value that extends beyond one of these termination conditions but termination will occur as described regardless of entered duration. An Action will be recorded upon termination, except in case of loss of power. If a duration has not yet been entered or any previous duration has expired, the menu will display a value of 0 HRS, and the menu may be entered by moving the cursor away from the leftmost position; the menu cannot be re-entered once a duration has been set. Immediately upon entering this menu, the duration value will change to 3 HRS, and the user may then choose a value from 2-9 hours. The user cannot select a value less than 2 hours, nor reset the value to 0 hours! Note that time is measured in 15-minute increments (see Measuring Time in the Description section above). If the user does not want to enter at least a 2 hours override, do not move the cursor away from its home position.

An Action is recorded to FLASH memory anytime the ADD WORK HRS menu is entered, even if the Access Level for the menu has been set to 0 (see SET MENU LEVELS menu). Further, an Action is recorded whenever ADD WORK HRS terminates due to any of the conditions listed above except for loss of power.

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP |  | A | D | D |  | W | O | R | K |  | H | R | S |  |  |  |
| BOTTOM |  | _ | # |  | H | R | S |  |  |  |  |  |  |  |  |  |

ADD FAN HRS Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | A | D | D |  | F | A | N |  | O | N |  | H | R | S |  |  |
| BOTTOM | _ | # |  | H | R | S |  |  |  |  |  |  |  |  |  |  |

Parameters:

| Display Location | Parameter | Allowed Values |
|---|---|---|
| BOTTOM-02 | Duration (hours) | 0, 2-9 |

Description:
This menu is available at all times only to authorized users. This menu provides an override to normal fan operation, forcing the fan into Continuous On operation for the specified duration. During this override, the high-speed/low speed fan is called as during normal fan operation (see the USE LO FAN ABOVE menu). The override begins at the time the user sets a duration and ends when (1) the duration has expired, (2) the current time reaches midnight, (3) a change is made in either the MODE or SYSTEM menus or (4) there is a loss of power. The programmable digital thermostat does not prevent entry of a value that extends beyond one of these termination conditions but termination will occur as described regardless of entered duration. An Action will be recorded upon termination, except in case of loss of power. If a duration has not yet been entered or any previous duration has expired, the menu will display a value of 0 HRS, and the menu may be entered by moving the cursor away from its home position; the menu cannot be re-entered once a duration has been set. Immediately upon entering this menu, the duration value will change to 3 HRS, and the user may then choose values from 2-9 hours. The user cannot set a value less than 2 hours, nor reset the value to 0 hours. Note that time is measured in 15-minute increments (see Measuring Time in the Description section above). If the user does not want to enter at least 2 hours override, the user should not move the cursor away from its home position!

An Action is recorded to FLASH memory anytime the ADD FAN ON HRS menu is entered, even if the Access Level for the menu has been set to 0 (see SET MENU LEVELS menu). Further, an Action is recorded whenever ADD FAN ON HRS terminates due to any of the conditions listed above except for loss of power.

NUDGE LIMIT Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | N | U | D | G | E |  | L | I | M | I | T |  |  |  |  |  |
| BOTTOM |  | + | / | - | # | F |  |  |  |  |  |  |  |  |  |  |

Parameters:

| Display Location | Parameter | Allowed Values |
|---|---|---|
| BOTTOM-05 | NLimit | +/−0-9 F. |

Description:
Sets a ±range that limits the temporary temperature override function ("nudge") in the MAIN menu.

CLOCK Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | C | L | K |  | D | S | T |  |  | 0 | 4 | : | 1 | 2 | A | M |
| BOTTOM | _ | M | O |  | A | U | G |  | 1 | 5 | , |  | 2 | 0 | 0 | 3 |

Parameters:

| Display Location | Parameter | Allowed Values |
|---|---|---|
| TOP-07 | DST | DST, STD |
| TOP-10 | Hours | 01-12 |
| TOP-13 | Minutes | 00-59 |
| TOP-05 | DST | DST or STD |
| TOP-15 | AM/PM | AM or PM |
| BOTTOM-02 | Day-of-the-week | MO, TU, WE, TH, FR, SA, SU |
| BOTTOM-05 | Month | JAN, FEB, MAR, APR, MAY, JUN, JUL, AUG, SEP, OCT, NOV, DEC |
| BOTTOM-09 | Day-of-the-month | 01-31 |
| BOTTOM-13 | Year | 2000-2099 |

Description:
This menu is available at all times only to authorized users.

Allows user to set the clock (to nearest minute), including date and day-of-week.

The clock may be automatically reset twice a year at the legally specified dates (see following) and times to implement Daylight Savings Time by setting DST. Setting STD prevents the automatic clock reset. Typically, the specified dates and times will include: (1) the first Sunday in April, at 2:00 AM . . . the RTC will be reset with hours+1; and (2) the last Sunday in October, at 2:00 AM . . . the RTC will be reset with hours−1.

MODE Menu
Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    |    | M  | O  | D  | E  |    |    |    |    |    |    |    |    |    |    |    |
| BOTTOM |    | _  | A  | U  | T  | O  |    |    |    |    |    |    |    |    |    |    |

Parameters:

| Display Location | Parameter | Allowed Values |
|---|---|---|
| BOTTOM-02 | Mode | OFF, STBY, COOL, HEAT, AUTO, |

Description:
This menu is available at all times only to authorized users.
User may set the operating mode:
OFF—the HVAC system is set off and no temperature control occurs; the MAIN menu continues to display current temperature and other information.
STBY—same as AUTO except system controls to temperatures set in the STANDBY TEMPS menu, rather than to those set in the PROGRAM menu.
HEAT—only the heating capabilities of the HVAC system will be used.
COOL—only the cooling capabilities of the HVAC system will be used.
AUTO—the thermostat will automatically select cooling or heating capabilities as necessary to maintain the MIN and MAX temperatures shown in the MAIN menu and set via the PROGRAM menu below).

AUTO and STBY modes operate as follows. For instructive purposes assume a SPLIT system with single stage heat and cool, and assume that the minimum and maximum temperatures have been set equal, e.g. 78 F. Also, for instructive purposes, ignore the effect of anticipation. Let operation begin (e.g. power up) with the ambient at 78 F. Neither heating nor cooling will be called (i.e. no relays closed). Let the ambient temperature rise. When the ambient reaches "maximum+differential+1 F", a call for cooling will be issued. The ambient temperature will gradually fall until it reaches "maximum−differential", at which time the call for cooling will be removed. The ambient temperature will again rise and when it reaches "maximum+differential", cooling will again be called. This cycle continues with the temperature constrained within the range "maximum−differential" to "maximum+differential." Note that the "+1 F" factor was effective only for the first cooling cycle; thereafter the limits were "maximum±differential." Let the ambient temperature now fall (naturally, not due to the HVAC cooling). When the ambient first fails to reach "maximum+differential" the system will remain off, with no calls for heating or cooling. As the temperature falls it may eventually reach "minimum−differential−1 F" at which time a call for heating will be issued. The ambient will then rise and when it reaches "minimum+differential", the call for heating will be removed. The ambient will then again fall until it reaches "minimum−differential" at which time the call for heating will be reinstated. This cycle continues with the temperature constrained within the range "minimum−differential" to "minimum+differential." Note that the "−1 F" factor was effective only for the first heating cycle; thereafter the limits were "minimum±differential."

PROGRAM Menu
Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    | P  | R  | O  | G  |    | M  | O  | #  | 1  |    |    | C  | P  | Y  | ?  | N  |
| BOTTOM |    | H  | H  | :  | M  | M  | A  | M  |    | #  | #  | F  | -  | #  | #  | F  |

Parameters:

| Display Location | Parameter | Allowed Values |
|---|---|---|
| TOP-06 | Day-of-week (DOW) | MO, TU, WE, TH, FR, SA, SU |
| TOP-09 | Event Number | 1-2 or 1-4 (selected with SYSTEM menu) |
| TOP-16 | Copy | "Y" or "N" (Yes or No) |
| BOTTOM-02 | Event Begins | 00:00 AM-11:45 PM in 15-minute steps |
| BOTTOM-10 | Set Temp Range | Min-Max, (50 F.-95 F.) |

Description:
This menu is available at all times only to authorized users.
This menu allows a user to set the beginning times when specific temperature control ranges (minimum to maximum temperatures) become effective. These beginning times are termed "events". The number of settable events per day is selected in the SYSTEM menu to be either 2 or 4 events per day. The times of the events are independently programmable for each day of the week. For each event, the user sets a beginning time and a minimum and maximum temperature. The maximum should be equal to or greater than the minimum, and the range should be within the limits of 50 F-95 F.
Each 2-event day is divided in time as follows:
00:00 AM—day begins within Event #2 from previous day
Event #1 begins
Event #2 begins
12:59 PM—day ends within Event #2 of current day
Each 4-event day is divided in time as follows:
00:00 AM—day begins within Event #4 from previous day
Event #1 begins
Event #2 begins
Event #3 begins
Event #4 begins
12:59 PM—day ends within Event #4 of current day
The time prior to Event 1 and the time following the final event of the day (Event 2 or Event 4) is considered to be "standby" time. The temperature control range for time prior to Event 1 (i.e. between midnight and Event 1) is set to be the same as that set for the final event of the same day. For example, for a 2 event per day setup, prior to the first event time—that is, between midnight and the first event—the temperature range is taken to be the range specified with event 2 (the final event) of the same day. "Standby" time is also set when an entire day is specified as a standby day using the STANDBY DAYS menu. However, in this case, the temperature control range is taken to be that specified with the STANDBY TEMPS menu. Likewise, when MODE is set to STBY, the temperature control range is that specified with the STANDBY TEMPS menu.

If "CPY?" (Copy) is set to "Y" (yes) when the DOW is changed, then all events data for the present DOW will be copied to the new DOW. Thus, a convenient method of operation is to first set all Monday events, set CPY? to Y, and then repeatedly increment the DOW to Friday, setting the event data to be the same for Monday through Friday. Then set CPY? to N before advancing to set Saturday events. It is permissible to have duplicate data for succeeding Events, but the Events should be in chronological order. That is, Event #2 should start at a time equal to or after Event #1, etc. If duplicate times are entered with different temperature ranges, the higher-numbered Event temperature range will prevail.

Special Note regarding programming for 2 Event/Day systems:

A problematic situation can arise under the following circumstance. Assume that the PROGRAM menu has been used to set an Event 1 temperature range of 50 F-95 F (or other "standby" range) for Saturday and Sunday; that is, these days are being considered as non-work hours. Now let the ADD WORK HRS menu be used to convert some time on Saturday (or Sunday) from non-work to work hours. For the override temperature range the programmable digital thermostat will use the Event 1 range for Saturday (or Sunday). But this range is not suitable for work hours. The solution is to program Saturday's (and/or Sunday's) Event 1 to have a desired work temperature range (e.g. 68 F-78 F) and to program Event 2 to a desired standby, non-work, temperature range . . . making the Event times the same. For example, let Saturday's Event 1 be 01:00 AM, range 68 F-78 F, and let Event 2 be 01:00 AM, range 50 F-95 F. Under non-override conditions the programmable digital thermostat will select the 68 F-78 F operating range for a duration of 0 minutes, effectively preventing 68 F-78 F operation. When an override is in effect (e.g. via the ADD WORK HRS menu), the programmable digital thermostat will select the Event 1 operating range—regardless of the time setting—and this will yield an acceptable operating range.

STANDBY TEMPS Menu
Display:

Parameters:

| Display Location | Parameter | Allowed Values |
| --- | --- | --- |
| BOTTOM-02 | Temp range during Standby Days | 50° F.-95 F. |

Description:

This menu is available at all times only to authorized users.

Sets the Minimum and Maximum temperature limits for operation during Standby Days and when MODE is set to STBY. See also the MODE and PROGRAM menus for further information.

STANDBY DAYS Menu
Display:

|  | 01 | 02 | 03 | 04 | 05 | 06 | 07 | 08 | 09 | 10 | 11 | 12 | 13 | 14 | 15 | 16 |
| --- | --- | --- | --- | --- | --- | --- | --- | --- | --- | --- | --- | --- | --- | --- | --- | --- |
| TOP | S | T | A | N | D | B | Y |  | D | A | Y | S |  |  |  |  |
| BOTTOM | _ | # | 0 | 1 |  | J | A | N |  | 0 | 1 |  |  |  |  |  |

Parameters:

| Display Location | Parameter | Allowed Values |
| --- | --- | --- |
| BOTTOM-03 | Number | 01-12 |
| BOTTOM-06 | Month | Jan, Feb, Mar, Apr, May, Jun, Jul, Aug, Sep, Oct, Nov, Dec |
| BOTTOM-10 | Day | 01-31 |

Description:

This menu is available at all times to authorized users.

Sets up to 12 days as Standby Days/Holidays. For these days temperatures are controlled to the limits set with the STANDBY TEMPS menu. Standby Days are numbered from 1 to 12 but need not be in chronological order. Note that the Year is not stored. Thus, days that recur on the same date each year need not be reset each year. Other holidays should be re-entered each year. To prevent standby operation for a specific Standby Day number, set a non-valid date, e.g. February 31.

|  | 01 | 02 | 03 | 04 | 05 | 06 | 07 | 08 | 09 | 10 | 11 | 12 | 13 | 14 | 15 | 16 |
| --- | --- | --- | --- | --- | --- | --- | --- | --- | --- | --- | --- | --- | --- | --- | --- | --- |
| TOP | S | T | A | N | D | B | Y |  | T | E | M | P | S |  |  |  |
| BOTTOM |  | 5 | 0 | F | - | 9 | 5 | F |  |  |  |  |  |  |  |  |

SYNCHRONIZE CLK Menu
Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    |    | S  | Y  | N  | C  | H  | R  | O  | N  | I  | Z  | E  |    | C  | L  | K  | ? |
| BOTTOM |    | _  | Y  | E  | S  |    |    |    |    |    |    |    |    |    |    |    |

Parameters:

| Display Location | Parameter | Allowed Values |
|------------------|-----------|----------------|
| BOTTOM-02        | CLKSYNCH  | YES or NO      |

Description:

This menu is available at all times to authorized users. It determines whether the Clock is automatically adjusted daily according to an internal counter of the power line zero crossings.

Many devices/instruments/appliances ("appliances") incorporate an electronic clock to maintain "current time and date" information for use in regulating various actions. For example, clock radios sound an alarm at a specific time; programmable electronic thermostats turn HVAC equipment on and off on specific days and at specific times; ovens, washing machines and other common appliances can be set to begin or end operation at specific times. There are numerous clock mechanisms for these appliances. This mechanism derives the time from a direct-current powered oscillator (electronic or electromechanical) within the appliance; the battery or other direct-current power source does not embody a timing signal. Unfortunately this oscillator commonly exhibits errors in timing accuracy that eventually lead to substantial cumulative timing errors.

One previous approach to reducing errors in timing accuracy and reducing cumulative timing errors is to improve the quality of the oscillator to maintain better stability of its frequency. For example, in wristwatches the use of high-quality components, careful design and manufacture, and the adjustment of the frequency of every watch allows better timing, but still not so accurate as can be obtained by deriving the timing from the AC power line. However, this approach of improving the oscillator typically adds cost to a product that contains the improved oscillator and can also increase the operating power requirement of the oscillator so that powering the oscillator from a battery or charged capacitor is no longer acceptable.

Another previous approach to reducing errors in timing accuracy and reducing cumulative timing errors is to provide two timing mechanisms, namely one deriving from an error-prone oscillator and another more accurate mechanism deriving from the AC power line. Circuitry within the appliance must select the appropriate time source depending on whether AC power is available or not. In addition, the oscillator mechanism must be kept synchronized with the AC power line derived mechanism. However, this approach can be both complicated and costly.

What is needed is a solution that reduces errors in timing accuracy and cumulative timing errors that does not does significantly increase cost, power consumption or complexity. The invention can include such a solution that is based on the combination of a clock mechanism and a common source for an accurate timing signal, for example the AC power line in the U.S. and other industrialized societies, that is easily accessible within the device/instrument/appliance. Thus, the invention can include a synchronize clock function.

For instance, consider an appliance that incorporates a clock that derives its timing signal from a direct-current powered oscillator and consider that the time of this clock can be set or amended by the use of appropriate circuitry. Further, consider that the AC power line voltage is accessible as a timing signal within the appliance, but that the clock derives its timing from the oscillator. When the oscillator-derived clock reaches a specific value, let that time value be saved as the "base" time and let an independent electronic counter immediately begin counting the frequency of the AC power line. When the independent counter has counted for a definite elapsed time, determined from the frequency of the AC power line, (1) let the counter be reset to begin counting the same elapsed time again and (2) let the clock be reset to a value that is equal to the elapsed time, as measured by the power line frequency counter, added to the base time. Let this new clock value be saved as the "base" time. As the sequence repeats, the clock will be periodically reset to a value equal to its "base" value plus the elapsed time measured by the counter. The result of this continuing sequence will be that the clock accuracy becomes equal to the accuracy of the power line frequency. Although the initial "base" time may be in error, unless the user has previously set the clock to the current correct time, no further clock error accumulates due to the error of the oscillator; rather, any error that accumulates during each elapsed time is eliminated at the end of that time by the resetting of the clock. The only error remaining is due to the frequency error of the power line and this error is extremely small. The oscillator-derived clock will indicate an instantaneous jump at the time of the resetting; the jump may be forward or backward in time by the small amount of the error. For many appliances this jump will be of no consequence. As an example, assume the current time according to the oscillator-derived time has just reached 1:59:55 AM (hr:min:sec format); this is an arbitrary time. Save this "base" time. Let the counter be arranged to count an elapsed time of exactly one hour, as determined by the AC power line frequency. Start the counter now to terminate in one hour. At that time, the oscillator-derived clock may indicate 3:00:05 AM, or any other time that has a [small] error due to the inaccuracy of the oscillator frequency during the elapsed hour. Reset the oscillator-derived clock to the "base" time plus the elapsed time; that is, 2:59:55 AM. As the sequence repeats, there will be no cumulative error beyond that of the AC power line frequency. In some appliances, for example as described in the specific implementation below, the mechanism is more easily implemented if the time when the sequence begins is controlled, rather than arbitrary.

A preferred embodiment of the synchronize clock function will now be described. An integrated-circuit real-time clock (RTC) derives time from its contained oscillator. A direct-current (DC) voltage having no timing signal (component) powers the real time clock. The alternating current (AC) power line signal is available and its frequency can be counted by a microcontroller within the device/instrument/appliances, in this embodiment, a programmable thermostat. This microcontroller can read, save, and set the time of the RTC. The thermostat provides a parameter via the "SYNCHRONIZE CLK?" menu that allows a user to enable or disable this feature. Assume that the parameter has been set to enable clock synchronization. Further, assume that the CLOCK menu has just been used to set the current time. As the user exits the CLOCK menu, the clock is set, and a flag (token) is set to false to indicate that the synchronization sequence should be restarted. As time passes, the RTC is read twice per second. At 1/60 second intervals the RTC time and the flag will be checked. When the RTC time is eventually found to be exactly 5:00 minutes (min:sec format) after an [any] hour and the flag is false, a counter will begin counting zero-voltage transitions of the AC power line waveform to time an elapsed time interval of exactly 24 hours and the flag will be set to true. Thereafter, whenever the 1/60 second interval checks find that the flag is true and that the 24-hour elapsed time interval has ended, the counter will be restarted to count another 24-hour interval and the RTC will be reset to exactly 5:00 minutes after the currently indicated hour. Note that some RTC error may have occurred between the time the user set the clock and the time the 24-hour counter began counting. The error over this one hour or less will be small. Although further error may accumulate during the 24-hour counting interval, this further error will be periodically eliminated when the RTC is reset at the end of each interval. Thus, the long-term cumulative error will be constrained to the error that occurred during the one hour or less delay before the first 24-hour interval count began.

Now consider the events following a loss of AC power—a power outage—to the appliance/device/instrument (e.g., programmable thermostat). When AC power again becomes available the thermostat will immediately set the flag to false. Thereafter, operation is as described above following the point at which the flag is set to false. During the power outage, the RTC is powered from backup direct current power (e.g. from a battery or from a charged capacitor). Depending on the duration of the power outage, some error in the RTC time will accumulate due to the inaccuracy of the oscillator in the RTC. This error will not be eliminated. However, as time passes the RTC will again indicate 5:00 minutes after an hour. At that time the synchronization sequence described above will repeat. Thus an uncorrected error in the time can accumulate from the beginning of the power outage until the beginning of the synchronization sequence. If the user finds this error unacceptable, the user should use the CLOCK menu to reset the RTC to the desired time.

One may ask, why is synchronization caused to occur at 5 minutes past an hour? The RTC integrated circuit used in the thermostat maintains both time and date information, including month, day-of-week, and day-of-month values. Consider what would happen if the RTC time were 11:59:59 PM and the synchronization sequence indicated that the time should now be set to 12:00:01 AM to correct an error of 2 seconds. The new time would be set in the RTC, but the RTC will fail to understand the new time as being in the next day. The RTC will leave its date data (month, day-of-week, day-of-month) unchanged and in error. By initiating the synchronization sequence at 5 minutes past the hour this problem is avoided so long as the time error in 24 hours remains less than 5 minutes, and this can be guaranteed by the RTC circuitry. If the time error is less than 5 minutes, the RTC date data remains valid.

SYSTEM Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | S | P | L | I | T |  |  |  | H |  | C |  | E |  | C | O |
| BOTTOM | E | V | / | D | Y | : | # |  | # |  | # |  | W | 3 |  | B | where:

System Type=SPLIT or HPUMP

EV/DY=number of program events/day: 2-4

H=number of heating stages: 1-3

C=number of cooling stages: 1-2

E=function of W3/E relay: W3, EM

CO=Changeover valve type ("O", "B")

Description:

This menu is available at all times to authorized users.

An authorized user can set the system configuration during installation.

All system configurations except for "SPLIT, H=1, C=1" require that both sides (Common and Return) of the 24 VAC transformer winding be connected to the programmable digital thermostat. The exception configuration may be powered by "stealing" current through the external Y1 and W1 relay coils, although this is never a first choice configuration and should be avoided when possible because the stolen current, although very small, may inadvertently energize a relay in some systems.

In systems in which 24 VAC is provided by two transformers (one for heating, one for cooling), it is the responsibility of the installer to correctly phase the transformers so that the "Return" from both systems can be tied together, either remotely or at the programmable digital thermostat Return terminal. In some systems, a failure to properly phase the transformers could lead to overheating of one or both transformers and/or damage to the to the HVAC equipment and the programmable digital thermostat. The Common/Hot from either transformer may be connected to the programmable digital thermostat C terminal, and that transformer will power the programmable digital thermostat.

Details Regarding the E (W3/E) Relay:

If E=W3, the W3/E relay will be used to call a third stage of heating if H has been set to 2. This could be used as auxiliary or additional emergency heating. If E=EM and the USE EMERGENCY HEAT? menu is set to Y and there is a need for heat (difference between set point and current temperature), then the W3/E relay will be used to call one stage only of emergency heating in lieu of all other heating (other heating relays will be set off), regardless of the setting for H. This could be described as alternate or manual emergency heating. See also the USE EMERGENCY HEAT? menu.

Details Regarding the Number of Events (EV#):

For leased/rented environments, setting EV=2 is most suitable. The first event may be taken to signal the beginning of "Work Hours" and the second event will signal the end of "Work Hours" and the beginning of "Standby Hours/After Hours." The ADD WORK HRS menu will be available to convert Standby Hours into Work Hours; see the ADD WORK HRS menu for details. During the ADD WORK HRS period the thermostat will control to the temperatures set for Event 1 of the current day-of-the-week; note that this is true even when ADD WORKS HRS is used to override a STANDBY DAY.

For environments requiring several comfort settings per day, such as restaurants and residences, setting EV=4 is more suitable. The programmed events (times and temperatures) cannot be overridden (with ADD WORK HRS), but the "nudge temperature" function of the MAIN menu remains available for small changes to set point temperatures.

Note Regarding Use of Low-Speed Fans:

The programmable digital thermostat firmware always assumes the presence of a relative humidity sensor and a low-speed fan controlled by the GL terminal of the programmable digital thermostat. In systems not having these elements, the RH sensor output terminal pin should be jumpered to programmable digital thermostat circuit ground (simulating 0% RH) and the HUMIDITY LIMIT menu should be set to 99% to prevent any calls for low-speed fan operation.

DIFFERENTIAL Menu

Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    | D  | I  | F  | F  | E  | R  | E  | N  | T  | I  | A  | L  |    | +  | /  | –  |
| BOTTOM | _  | #  |    | (  | 1  | /  | 4  | F  |    | S  | T  | E  | P  | S  | )  |    |

Parameters:

| Display Location | Parameter    | Allowed Values |
|------------------|--------------|----------------|
| BOTTOM-02        | Differential | 0-9            |

Description:

This menu is available at all times to authorized users.

A Level 3 or higher user can set a differential value for the system. The differential is set in ¼° F. increments, allowing a range from ±0° F. to ±2¼° F. Note that operation is ±the set value. Under normal conditions, the thermostat will control temperature within a range defined by the set point±the Differential. Thus, a set point value of 68° F. with a Differential of "04" (1° F.) will control within the range 67° F.-69° F.

FAN MODE Menu

Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    |    | F  | A  | N  |    | M  | O  | D  | E  |    |    |    |    |    |    |    |
| BOTTOM | _  | A  | U  | T  | O  |    |    |    |    |    |    |    |    |    |    |    |

Parameters:

| Display Location | Parameter | Allowed Values     |
|------------------|-----------|--------------------|
| BOTTOM-02        | Fan mode  | AUTO or CONTINUOUS |

Description:

This menu is available at all times to authorized users.

A user can set the Fan Mode for the system when it is not in Standby. When in Standby operation (either via the MODE menu or the STANDBY DAYS menu), the Fan Mode is always "Auto".

When set to Auto, a call is made for either the low speed or high speed fan (see USE LO FAN ABOVE menu) simultaneous with any call for heating or cooling. When set to Continuous, a call is made for either the low-speed or high-speed fan (depending on humidity) at all times.

MIN ON/OFF TIME Menu

Display:

|        | 01 | 02 | 03 | 04 | 05 | 06 | 07 | 08 | 09 | 10 | 11 | 12 | 13 | 14 | 15 | 16 |
|--------|----|----|----|----|----|----|----|----|----|----|----|----|----|----|----|----|
| TOP    | M  | I  | N  |    | O  | N  | /  | O  | F  | F  |    | T  | I  | M  | E  |    |
| BOTTOM | _  | #  |    | M  | I  | N  | U  | T  | E  | S  |    |    |    |    |    |    |

Parameters:

| Display Location | Parameter | Allowed Values |
|---|---|---|
| BOTTOM-02 | Min On/Off Delay | 0-9 minutes |

Description:

This menu is available at all times to authorized users.

A user can set a Minimum On/Off delay for the system. The Minimum On/Off time sets a minimum time that a cooling or heating relay may be on or off before its state can be changed. Setting a too-long time can prevent proper temperature control. Setting a too-short time can result in damage to some HVAC equipment, although many modern HVAC systems are protected against such short-cycling by circuitry internal to the HVAC equipment itself.

NEXT STAGE ERROR Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | N | E | X | T |  | S | T | A | G | E |  | E | R | R | O | R |
| BOTTOM | _ | # | F |  |  |  |  |  |  |  |  |  |  |  |  |  |

Parameters:

| Display Location | Parameter | Allowed Values |
|---|---|---|
| BOTTOM-02 | Temp error | 1-9 units in 1 F steps |

Description:

This menu is available at all times to authorized users.

A user can set a temperature error—the difference between the current temperature and the set point temperature (including differential)—that should be exceeded before the 2nd stage of heating or cooling is called. An additional error of the same amount should be exceeded before the $3^{rd}$ stage of heating is called. The availability of multistage heating and cooling is set with the SYSTEM menu. See also the E parameter of the SYSTEM menu and see also the USE EMERGENCY HEAT? menu.

TEMP SENSOR CAL Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | T | E | M | P |  | S | E | N | S | O | R |  | C | A | L |  |
| BOTTOM | _ | A | D | J | : | # | # |  |  | N | O | W | : | # | # | F |

Parameters:

| Display Location | Parameter | Allowed Values |
|---|---|---|
| BOTTOM-02 | Adjust (~1 F units) | 00-12, where 08 = no adjustment |
| BOTTOM-03 | Now (Current Temp readout) | 50-95 in 1 F steps |

Description:

This menu is available at all times to authorized users.

The calibration of the temperature sensor may be altered in steps of ~1° F. To calibrate: with the cursor at the ADJ value, press the UP or DN button until the indicated current temperature following NOW: is correct. the user will not be allowed to force a reading outside the range of 50-95 F; that is, the user cannot calibrate the sensor if the current temperature is outside the 50-95 F range. Pressing the UP button will increase the adjustment value and will cause the NOW value to rise; pressing the DN button will decrease the adjustment value and will cause the NOW value to drop.

SENSOR LOCATION Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | S | E | N | S | O | R |  | L | O | C | A | T | I | O | N |  |
| BOTTOM | _ | I | N | T | E | R | N | A | L |  |  |  |  |  |  |  |

Parameters:

| Display Location | Parameter | Allowed Values |
|---|---|---|
| BOTTOM-02 | Sensor Location | INTERNAL or REMOTE |

Description:
This menu is available at all times only to authorized users. A user can select operation with either the internal or the optional remote temperature sensor. A separate Remote Sensor Kit should be purchased for remote operation.

USE LO FAN ABOVE Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | U | S | E |  | L | O |  | F | A | N |  | A | B | O | V | E |
| BOTTOM |  | # | # | % | R | H |  |  |  |  |  |  |  |  |  |  |

Parameters:

| Display Location | Parameter | Allowed Values |
|---|---|---|
| BOTTOM-02 | RH Threshold | 00-99 in approx 1% RH steps, uncalibrated |

Description:

This menu is available at all times to authorized users.

Sets the relative humidity (RH) sensor threshold to determine whether to use low-speed or high-speed fans. For intermediate RH values the accuracy will be within about ±6% RH but the accuracy will degrade significantly near the 0% and 99% settings. For normal humidity control use, the parameter should be set to a desired moderate RH level (e.g. 65%) and then adjusted experimentally up or down as necessary to achieve the exact desired threshold. Setting this parameter to 99% turns off humidity control because the measured RH will always be below the threshold, and the low-speed fan will never be used; this should be the default setting for the programmable digital thermostat not having an RH sensor. (If the RH sensor is not installed, a jumper from the sensor output to +5V will have the same effect and is the preferred circuit configuration in the absence of a sensor.)

EMERGENCY HEAT Menu (Manual Emergency Heat)

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | U | S | E |  | E | M | R | G |  | H | E | A | T | ? |  |  |
| BOTTOM |  | Y |  |  |  |  |  |  |  |  |  |  |  |  |  |  |

Parameters:

| Display Location | Parameter | Allowed Values |
|---|---|---|
| BOTTOM-02 | Source of heating | On or Off |

Description:

This menu is available only if E=EM in the SYSTEM menu and only to authorized users.

If E is set to EM in the SYSTEM menu and the USE EMRG HEAT? menu is set to Y, then all calls for heating will activate the W3/E relay in lieu of the stage-1 and stage-2 heat relays. If E is set to W3 in the SYSTEM menu, the USE EMERG HEAT? menu is not available.

HUMIDIFIER ALERT Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | H | U | M | I | D | I | F | I | E | R |  | A | L | E | R | T |
| BOTTOM |  | # | # | M | O | S |  | M | O | N |  | D | Y | , | Y | R |

Parameters:

| Display Location | Parameter | Allowed Values |
|---|---|---|
| BOTTOM-02 | Check interval | 0-12 months |
| BOTTOM-08 | Date of next alert | Calculated from time alert is set |

Description:
This menu is available at all times to authorized users.

Sets a reminder to check the humidifier. The interval begins at the time it is set. The interval ends at the expiration of the entered value, relative to the day it was entered. Setting "0 months" disables the reminder. The date of the next alert is displayed, calculated by adding the interval to the current date.

A message in the MAIN menu announces the arrival of the appropriate day. To clear the MAIN menu message, the user should enter and exit the HUMIDIFIER ALERT menu again. By re-entering this menu, the start day of the interval will be reset to the current day.

AIR FILTER ALERT Menu
Display:

| | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | | A | I | R | | F | I | L | T | E | R | | A | L | E | R | T |
| BOTTOM | | # | # | | M | O | N | T | H | S | | | | | | |

Parameters:

| Display Location | Parameter | Allowed Values |
|---|---|---|
| BOTTOM-02 | Check interval | 0-12 months |

Description:

This menu is available at all times to authorized users.

Sets a reminder to check the air filter. The interval begins at the time it is set. The interval ends at the expiration of the entered value, relative to the day it was entered. Setting "0 months" disables the reminder. The date of the next alert is displayed, calculated by adding the interval to the current date.

A message in the MAIN menu announces the arrival of the appropriate day. To clear the MAIN menu message, the user should enter and exit the AIR FILTER ALERT menu again. By re-entering this menu, the start day of the interval will be reset to the current day.

ASSIGN PINS Menu
Display:

| | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | A | S | S | I | G | N | | P | I | N | S | | | | | |
| BOTTOM | # | 0 | 1 | | 0 | 0 | 0 | 0 | 0 | | | L | V | L | 1 | |

Parameters:

| Display Location | Parameter | Allowed Values |
|---|---|---|
| BOTTOM-03 | PIN ID | 01-10 |
| BOTTOM-15 | Access LVL | 0-9 |
| BOTTOM-06 | PIN Value | "00000"-"65535" |

Description:

This menu is available at all times to authorized users.

The user may assign up to 10 Personal Identification Numbers (PIN's), each with an associated access level, LVL (0-9). To view and use a menu, a user's PIN should be assigned a LVL equal to or greater than the access level assigned to that Menu using the SET MENU LEVELS menu.

Upon entering this menu the first PIN ID that has a PIN value of "00000" will be displayed. If no PIN ID has a PIN value of "00000", then the message "OVERWRITING PIN" will be displayed in the top line and the data for PIN ID 10 will be displayed in the bottom line. The user may then (1) overwrite (change) the displayed PIN and LVL, (2) use the UP/DN buttons to view or change another PIN, (3) move the cursor to its home position and exit the menu, leaving all PIN's unchanged, or (4) not press any button for 1 minute, allowing the programmable digital thermostat to revert to normal operation with no PIN changes.

If a user attempts to set (by exiting the menu or changing the displayed PIN ID) a duplicate PIN value—regardless of its LVL—the top line of the programmable digital thermostat will display "DUPLICATE PIN" and the bottom line will continue to display the duplicate value that has been entered. The user may then (1) enter a non-duplicate PIN value and LVL, including "00000" for which duplicates are allowed. If a user attempts to duplicate a PIN value when "OVERWRITING PIN" is displayed, the response will be as just described. Note that the old PIN value that was overwritten cannot be retrieved. This should not be a problem since the user had already been notified that overwriting was in effect.

The ten access levels would typically be assigned as follows but many other arrangements are possible:

| LVL | Persons assigned this access |
|---|---|
| 0* | Anyone |
| 1 | Office Manager |
| 2 | Maintenance/System Installer |
| 9** | Owner |

*The PIN "00000" is always assigned a LVL of 0; this cannot be changed.

**Certain menus require a LVL 9 for access; therefore, at least one PIN should be assigned a LVL of 9. When shipped from the factory, all programmable digital thermostats are preprogrammed with several default PIN's having a LVL of 9. After programmable digital thermostat installation, the purchaser should reassign these PIN's and LVL's to maintain security of the codes.

SET MENU LEVELS Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | M | E | N | U |  | T | E | X | T |  | H | E | R | E |  |  |
| BOTTOM | _ | M | E | N | U | : | # | # |  | L | V | L | = | # |  |  |

Description:

This menu is accessible at all times but only to users having a LVL 9 PIN.

This menu allows the user to set the minimum PIN Level's required to access menus. Place the cursor at ## to select a Menu Number, and then enter a LVL at #. The user should obtain Menu Numbers from documentation outside the programmable digital thermostat itself (e.g. the Installation Guide), as displayed menus are not numbered.

While most menus have settable LVL's, there are exceptions:

The LVL of the MAIN menu for viewing only is permanently set at 0, but access to the temperature override feature ("nudge") in the MAIN menu is settable.
The LVL of the ENTER PIN menu is permanently set at 0.
The LVL of the SERIAL NUMBER menu is permanently set at 0.
The LVL of the MENU LEVELS menu is permanently set at 9.
The LVL of the ASSIGN PINS menu is permanently set at 9.

It is important to appreciate that the above described implementation of an adaptive (programmable) hierarchy is not the only way in which this aspect of the invention can be implemented. The above-described example can be termed reversibly defining since the set menu can be later revisited and the levels changes. An alternative to the above-described approach would be a non-reversibly (set once only) approach for tamper resistant purposes. Another alternative to the above-described single set menu (centralized) approach to setting the PIN level(s) needed to access other menu(s), is to provide individual (distributed) access level setting menus each of which is associated with, and optionally accessed in conjunction with, each of the one or more menus(s) for which a PIN access level is to be defined. For instance, in the case where reversibly defining includes reversibly defining a plurality of minimum user levels required to access a plurality of menus, a plurality of distributed menus can be utilized to reversibly define the plurality of minimum user levels, each of the distributed menus optionally accessed by first accessing the associated function menu. Three specific alternative distributed access level setting menus will now be described.

Alternative NUDGE LEVEL Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP |  | N | U | D | G | E |  | L | E | V | E | L |  |  |  |  |
| BOTTOM |  | # |  |  |  |  |  |  |  |  |  |  |  |  |  |  |

Parameters:

| Display Location | Parameter | Allowed Values |
|---|---|---|
| BOTTOM-05 | Nudge Level | 1-4 |

Description:
Sets a minimum PIN level required to access the NUDGE TEMP Menu.

Alternative ADD WORK HRS Menu
Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | A | D | D |  | W | O | R | K |  | H | R | S |  |  |  |  |
| BOTTOM | _ | # |  | H | R | S |  | H | H | : | M | M | A | M |  |  |

Parameters:

| Display Location | Parameter | Allowed Values |
|---|---|---|
| BOTTOM-02 | Added hours of control to "work temperatures" | 2 through 9 |
| BOTTOM-08 | Actual end time of added hrs |  |

Description:
This menu can be made available only to authorized users, only when E/D=2 in the SYSTEM TYPE menu, and only during Standby Hours.

This allows user to override settings in the PROGRAM menu when EV=2. The first programmed time-event of each day is taken to be the start of "work hours" and the programmed temperature range for that time-event is taken to be "work temperatures." The ADD WORK HRS menu forces the system to control to "work temperatures" during non-work hours. The override begins at the time the user saves a duration via this menu and ends when the duration has expired or the current time reaches midnight, whichever occurs first; the override does not terminate at the end of the currently programmed time-event. If a duration has not yet been entered or any previous duration has expired, the menu will display a value of 0 HRS, and the menu may be entered by moving the cursor away from the leftmost position; the menu cannot be re-entered once a duration has been set. Immediately upon entering this menu, the duration value will change to 2 HRS, and the user may then choose values from 2-9 hours. In this particular alternative embodiment, the user cannot select a value less than 2 hours, nor reset the value to 0 hours! Therefore, if you do not wish to enter at least 2 hours override, do not move the cursor away from its home position.

Alternative ALERT LEVELS Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | A | L | E | R | T | S |  | L | E | V | E | L |  |  |  |  |
| BOTTOM |  | # |  |  |  |  |  |  |  |  |  |  |  |  |  |  |

Parameters:

| Display Location | Parameter | Allowed Values |
|---|---|---|
| BOTTOM-02 | ALERT MENUS access | 1-4 |

Description:

Sets the minimum PIN Level required for entering the AIR FILTER ALERT and HUMIDIFIER ALERT menus.

Of course, other menus besides the three particular alternatives described above can be provided (configured) with an individual (distributed) access level setting menu. This concludes the description of the alternative individual (distributed) access level setting menus and the description will now revert to the primary example.

SERIAL NUMBER Menu

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP | S | E | R | I | A | L |  | N | U | M | B | E | R |  |  |  |
| BOTTOM |  | 0 | 0 | 0 | 0 | 0 | 0 | 0 | 0 | 0 | 0 |  |  |  |  |  |

Parameters:

| Display Location | Parameter | Allowed Values |
|---|---|---|
| BOTTOM-02-11 | Serial Number | 0000000000-9999999999 |

The Serial Number may be set by one of these methods:

1. Programming the SN into the PIC microcontroller 1020 at the same time that other data is programmed into the IC during programmable digital thermostat manufacture.

2. Using one of the 10 PIN's as a "factory" PIN by setting the LVL of that PIN to 10 during PIC programming. Factory personnel should overwrite this LVL to 0-9 before shipping the programmable digital thermostat. This allows easy factory access for setting/re-setting the SN; but once the "factory" PIN LVL has been changed from 10, it cannot be reset to 10 from the panel by anyone, including factory personnel.

3. Software on a Host Computer may read and write a SN at any time.

DOWNLOAD DATA Menu

Note: This is not a selectable menu, as are all others above. This menu is displayed automatically when the programmable digital thermostat is operating in its MAIN menu and receives data via its DB9/EIA-232 connector using software running on a host computer.

Display:

|  | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| TOP |  | C | O | M | M |  | A | C | T | I | V | E |  |  |  |  |
| BOTTOM |  |  |  |  |  |  |  |  |  |  |  |  |  |  |  |  |

Description:

This menu is viewable at all times by all authorized users. A 10-digit number uniquely identifies the programmable digital thermostat. A Host Computer can associate (in its database) this SN with data specific to this particular programmable digital thermostat. The format (i.e. the significance of each digit) of the Serial Number is not defined at this time.

Parameters:

| Display Location | Parameter | Allowed Values |
|---|---|---|
| TOP-01 | Menu title | "COMM ACTIVE" |
| BOTTOM-01-09 | None | None |

Figure 9:
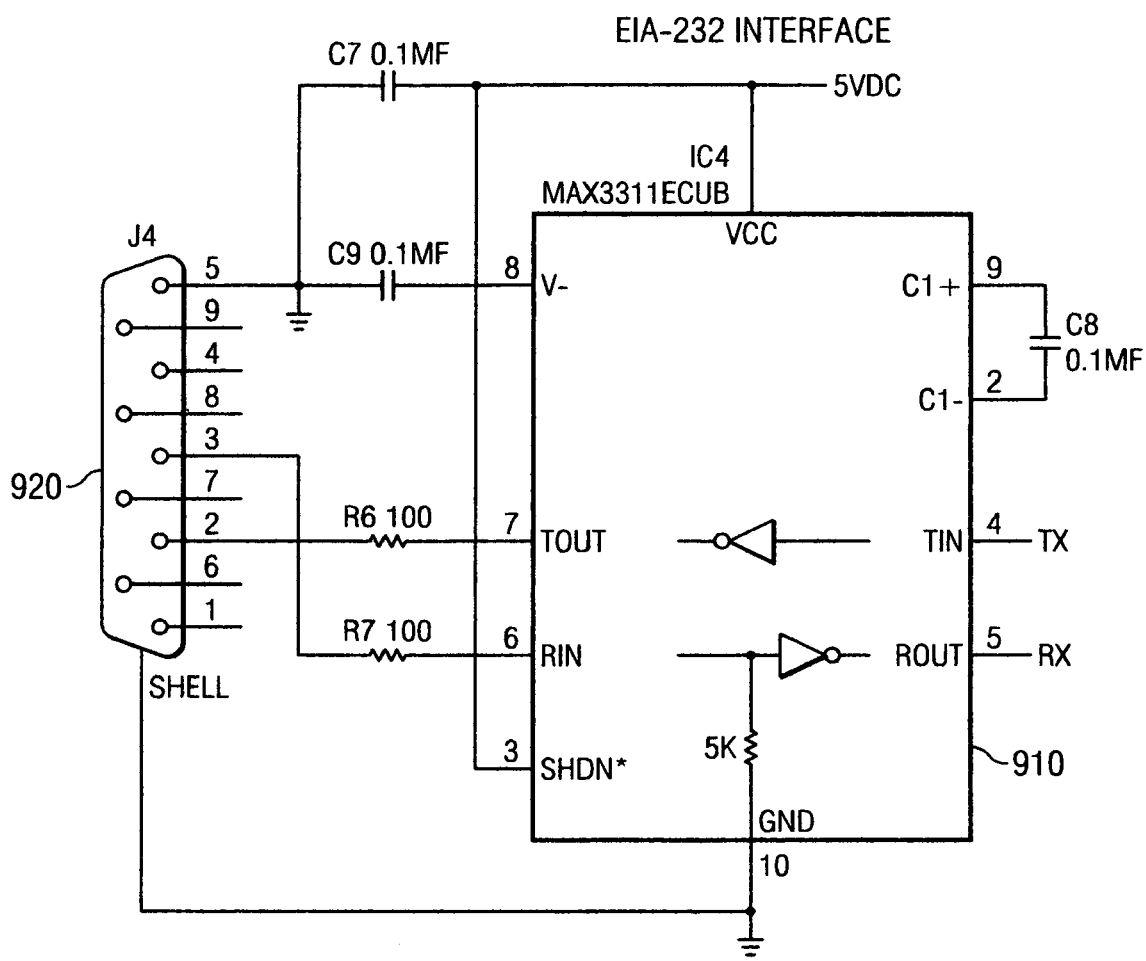
FIG. 9 illustrates a circuit diagram of a portion of a programmable digital thermostat including an interface, representing an embodiment of the invention.
Figure 12:
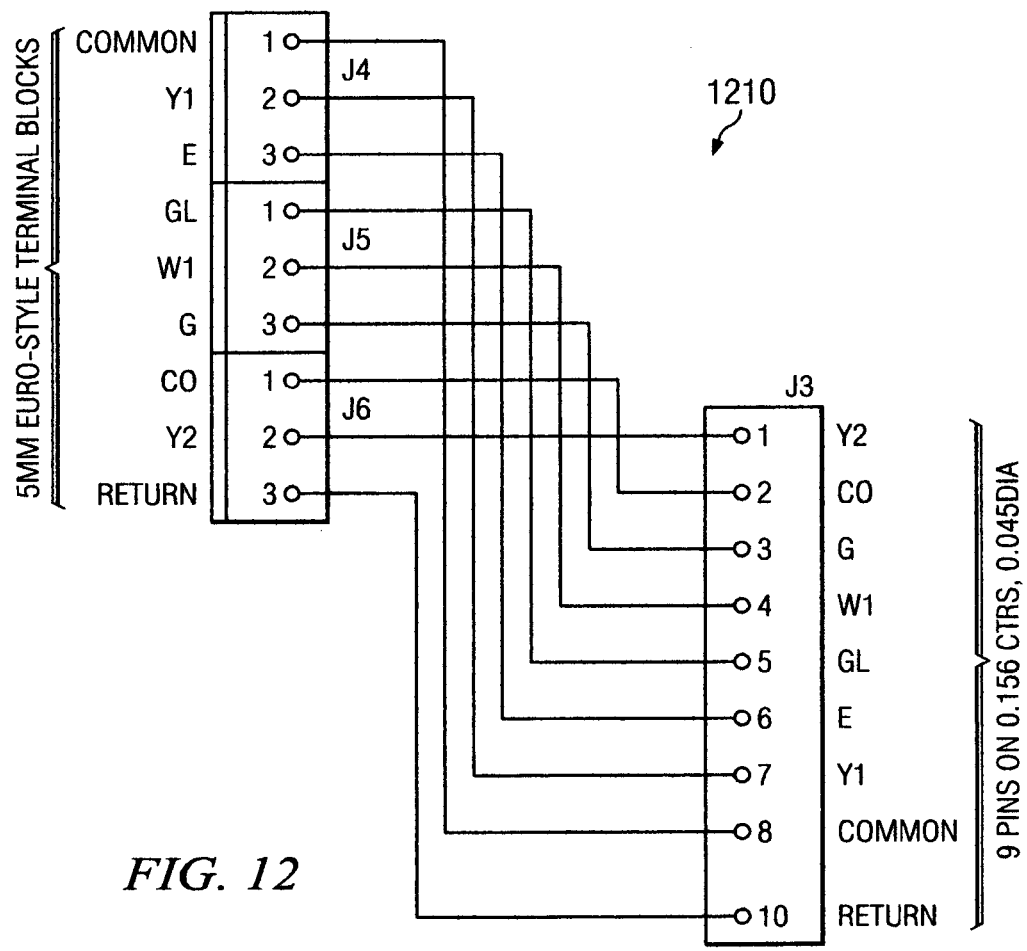
FIG. 12 illustrates a circuit diagram of a cable for use in combination with a programmable digital thermostat, representing an embodiment of the invention.

Description:

Referring to FIG. 9, an off-the-shelf IC (integrated circuit) 910 converts the microcontroller logic level signals to EIA-232 levels; this IC has built in ESD (electrostatic discharge) protection. A female DB9 connector 920 is used on the programmable digital thermostat. Referring to FIG. 12, an off-the-shelf, standard, "straight through" PC serial data cable 1210 is used to connect the programmable digital thermostat to a PC. For those PC's not having an EIA-232 port, an external USB-to-EIA-232 converter should be used (it is to be noted that such converters may implement non-standard EIA-232 ports). EIA-232 Communication Parameters are fixed at 38400 baud, 8 data bits, 1 start bit, 1 stop bit, no parity.

It may take some time to complete a dump of the programmable digital thermostat's data contents to the PC, and/or for the time for the PC to write new parameters to the programmable digital thermostat's EEPROM. Factors other than baud rate alone will likely limit overall data transmission rate (during both transmit and receive). With a PC connected and running custom software, data can be transferred in both directions between the programmable digital thermostat and the PC.

It behooves the operator of the DCD to observe normal precautions regarding static electricity discharge during use of the DCD to avoid damage to both the DCD and the thermostat. The operator should ensure that any static charge on either the DCD or its RS232 serial cable is discharged BEFORE connecting the DCD to the thermostat's DB9 interface connector! This can generally be done by having the operator touch the metal shell (not the data pins!) of the DB9 connector prior to plugging in the data cable.

PIN Level Required: None. This is an automatic Menu.

A methodology of communication with the programmable digital thermostat will now be described.

Hardware Definition

Referring again to FIG. 9, the programmable digital thermostat incorporates a female 9-pin subminiature D connector 920 (a.k.a. DB-9) as its data port. From the programmable digital thermostat's perspective, the pins of this connector are:

Pin2=Data Out
Pin3=Data In
Pin5=Ground

All other pins are "no connection."

Referring again to FIG. 12 It is expected that a standard "straight through" serial cable 1210 connects the programmable digital thermostat's DB-9 to the PC's DB-9. It is suggested that the cable be kept to less than 6 feet in length.

The programmable digital thermostat employs a standard EIA-232 compliant USART. The Data Out signal swing of −5V to +5V provides ample signal level for most PC serial ports. There are no hardware or software handshake signals. Signaling is fixed at 38.4 Kbaud.

Communication Protocol

The programmable digital thermostat should be powered up and operating with its MAIN menu displayed prior to connecting to the DB9 connector. All data exchanged between the programmable digital thermostat and the host computer is 8-bit binary bytes.

Programmable Digital Thermostat Data Format

Data stored in the Programmable digital thermostat is divided into two major sections: Operating Parameters (stored in EEPROM) and the Actions Log (stored in FLASH memory).

Power and installation issues will now be described.

Main Circuit Board Components

Figure 8A:
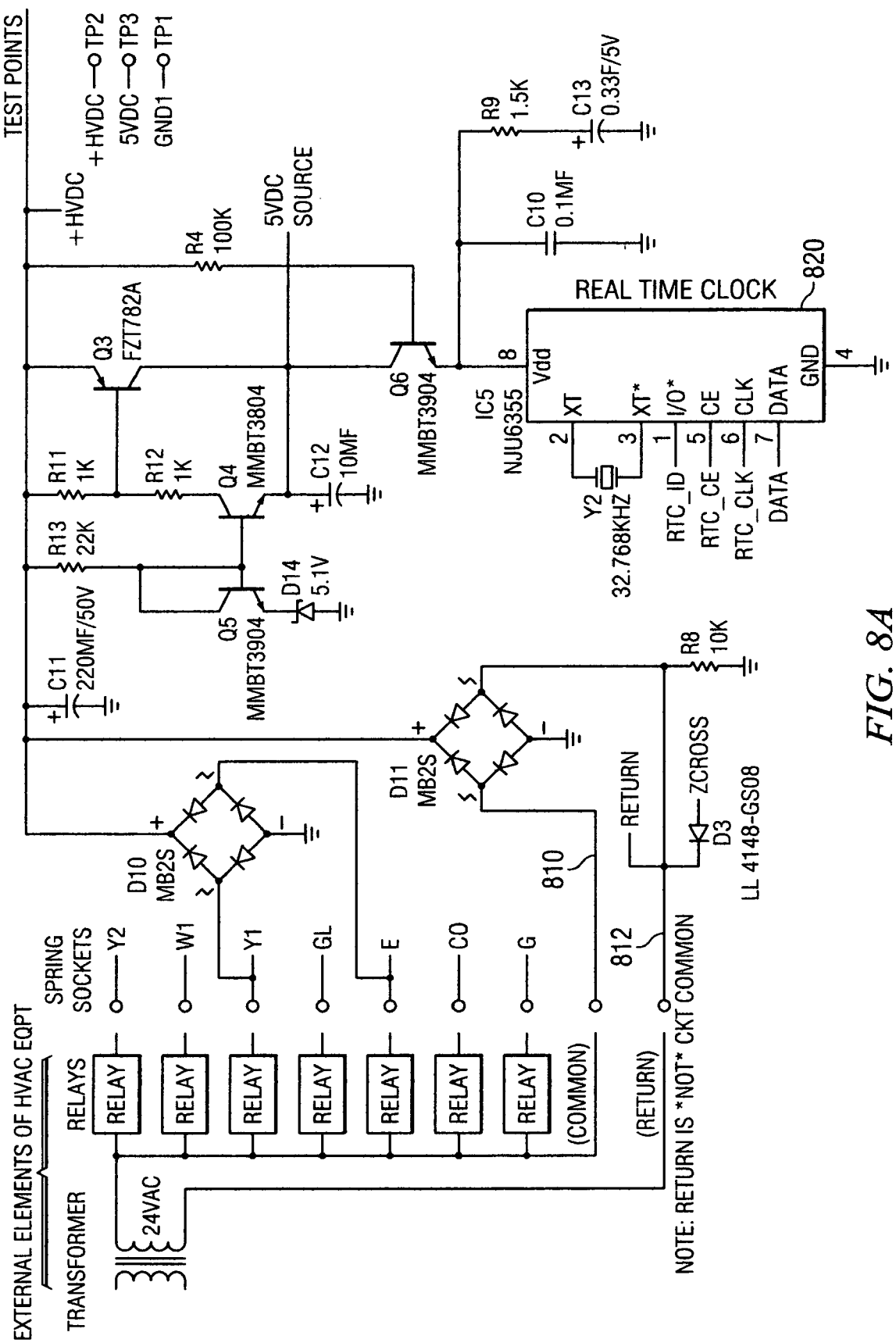
FIGS. 8A-8C are partial figures intended to form one complete figure that illustrates a circuit diagram of a portion of a system that includes a programmable digital thermostat, representing an embodiment of the invention.
Figure 8B:
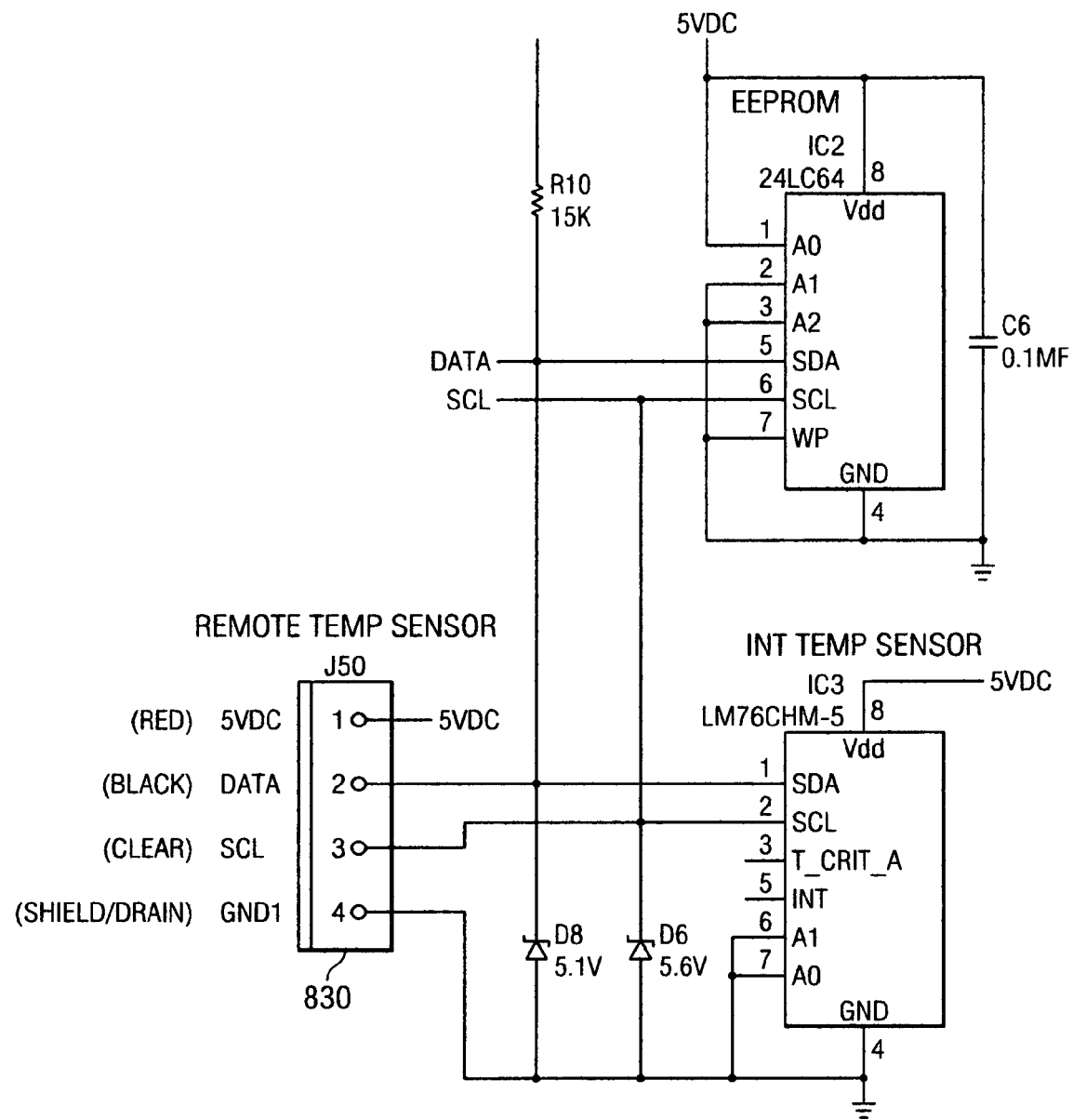
Figure 8C:
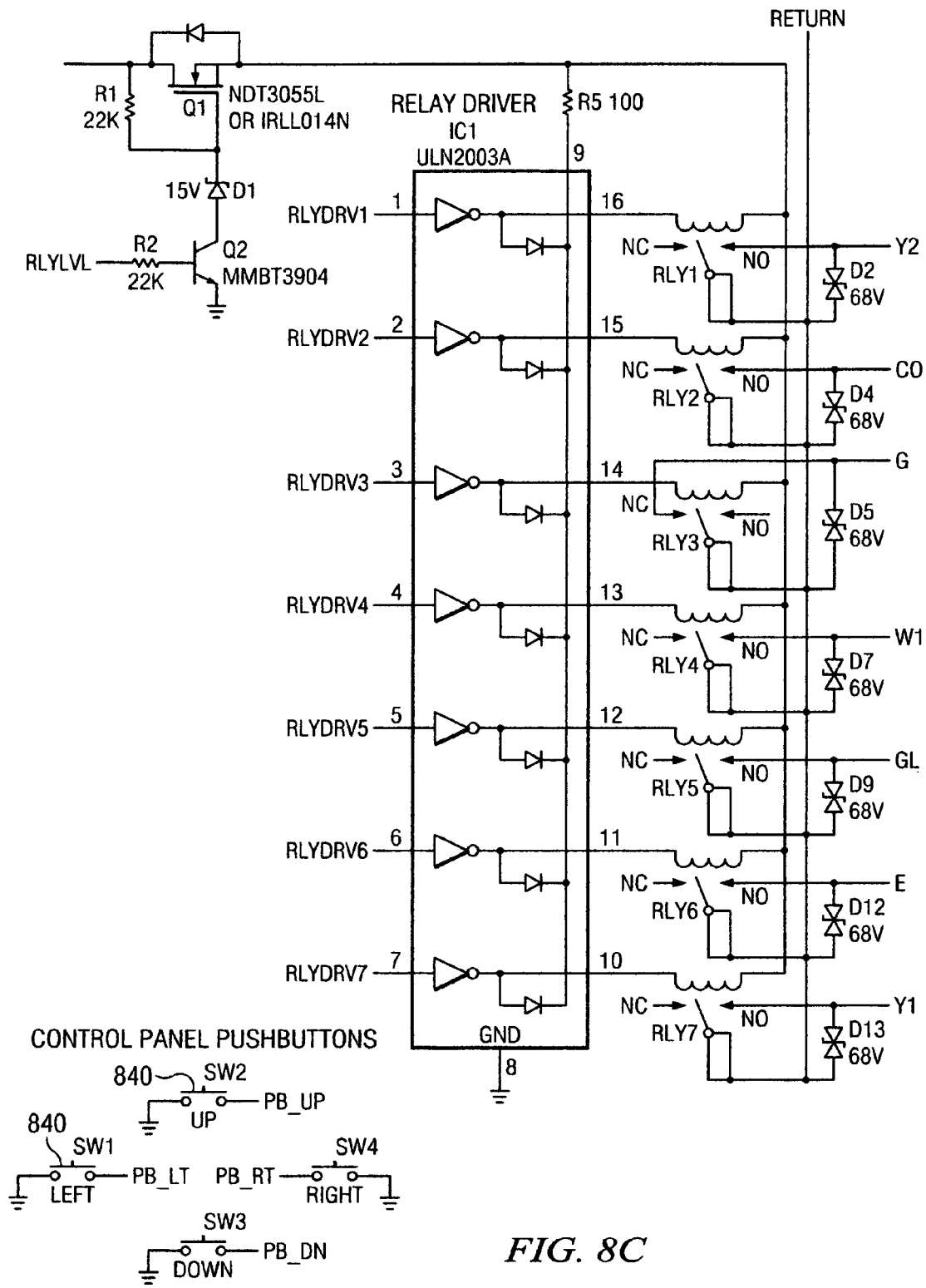

Referring to FIGS. 8A-8C, power for thermostat operation is normally taken from the 24 VAC present between the "Common" 810 (hot) and "Return" 812 (ground) connections at the 9-circuit terminal block.

For older systems of the separate heat and cool type that do not have the "Common" wire brought to the wall mounting location, the thermostat is able to "steal" (see following paragraph) power using the Heat and Cool relays. This method of powering the thermostat can be used only with 1-stage heat+1-stage cool systems. This method of powering the thermostat cannot be used with heat pump systems and is never the preferred method. Use the "Common" connection whenever possible.

To "steal" power, the thermostat draws a small current through either the heat or cool relay—whichever is not currently activated. In most systems this current is small enough that it will not activate a relay that is not already active. However, no warranty is made that this method of powering the programmable digital thermostat is compatible with all systems. It is the responsibility of the installer to test that the "stolen current" does not wrongly activate a relay or cause unacceptable vibration of the relay through which this current flows! If undesired relay activation or vibration occurs, the installer should provide connection to the 24 VAC "Common" 810 terminal of the 24 VAC system transformer.

Real Time Clock Circuit

Power for the Real Time Clock circuit 820 is normally derived from the 24 VAC as described above, and a high value capacitor (aka "supercap" or "double-layer cap") on the circuit board is kept fully charged. When AC power is lost, the charge stored in the capacitor is used to power only the Real Time Clock 820 so that the clock will not require resetting every time power is lost. Under normal conditions—after the capacitor has been allowed to charge fully—the Clock 820 can run accurately for up to 72 hours without AC power.

Upon initial installation the capacitor may be fully discharged. Upon connection of AC power the Real Time Clock 820 will function normally but it may take up to 8 hours for the capacitor to charge completely. Thus, if AC power is removed shortly after installation, the Real Time Clock 820 may fail to operate correctly until AC power is restored and the capacitor is allowed to fully charge.

Multiple Stages

Calls for secondary and tertiary stages always include the lower level calls. For example, when a call is made for $3^{rd}$ stage heat, calls are also present for $2^{nd}$ and $1^{st}$ stage heat. If Emergency Heat is active, all other heating calls are turned off, leaving a single call for $1^{st}$ stage emergency heating.

Interconnections—Thermostat to HVAC Wires

A 9-circuit terminal block is provided for connection of the wires from the HVAC system. The function of each circuit/terminal is shown in the table below. BEFORE CONNECTING ANY WIRES, review the table to learn the function of each terminal for the system type being connected!

The "Common" 810 (often called "hot") wire from the HVAC equipment connects within the HVAC equipment to each of the relays for the fan, compressor, heater, etc. This wire also connects within the HVAC equipment to one end of a 24 VAC transformer winding. The "Return" 820 wire connects to the other end of the 24 VAC transformer winding.

To avoid damage to HVAC equipment, the following precautions should be observed.

If separate transformers are used to power the heating and cooling equipment, the "Return" of each transformer should be connected to the Programmable digital thermostat's Return® terminal. It is the responsibility of the system installer to ensure that any 24 VAC transformers be properly phased so that the "Return" from both systems can be safely tied together, either remotely or at the programmable digital thermostat's Return terminal. In some systems, a failure to properly phase the transformers could lead to overheating of one or both transformers and/or damage to the to the HVAC equipment and Programmable digital thermostat.

It should be noted that anomalous HVAC operation may result until the programmable digital thermostat parameters have been properly set for the particular system in use. Whenever possible, it is recommended that the programmable digital thermostat be initially connected to only the 24 VAC "Common" and "Return" wires. After all system parameters are set, the other relay wires may then be connected.

It is also to be noted that immediately upon power-up, for up to 0.1 seconds, the G relay (normal-speed or high-speed fan) contacts may be closed. Within 0.1 seconds the contacts will open and normal relay action will continue. This brief "fan on" operation occurs only at power-up and results from circuitry that minimizes current draw for operation with systems not having a 24 VAC "common" (hot) wire.

The following table indicates the function of each terminal for both Split (separate heating and cooling equipment) and Heat Pump systems. The terminal names are printed on the Terminal Board within the Programmable digital thermostat base.

| TERMINAL | SPLIT SYSTEMS | HEAT PUMP SYSTEMS |
| --- | --- | --- |
| C | Common/hot wire from 24 VAC Xfmr | Common/hot wire from 24 VAC Xfmr |
| Y1 | $1^{st}$ stage cooling | Compressor, $1^{st}$ stage |
| W1 | $1^{st}$ stage heating | No Connection |
| Y2 | $2^{nd}$ stage cooling | Compressor, $2^{nd}$ stage |
| W3/E | Emergency heat or $3^{rd}$ stage heating | Emergency heat or $3^{rd}$ stage heating |
| G | Fan, normal speed | Fan, normal speed |
| W2/CO | $2^{nd}$ stage heating | Changeover valve |
| GL | Fan, low speed | Fan, low speed |
| R | Return, from 24 VAC transformer | Return, from 24 VAC transformer |

Automatic Anticipation

The thermostat features unique control of anticipation. To understand operation, consider a typical cycle of "heating". As the ambient temperature falls below the value "Set Point−Differential", the thermostat will issue a call for heat. This call will remain in effect until the temperature rises to "Set Point+Differential−Anticipation" at which point the heating will be turned off. (Anticipation is initially set to 0.) The thermostat will continue to monitor the temperature after heating is off, recording the highest temperature attained (the "overshoot"). The temperature will eventually fall and the cycle will repeat. For the next cycle, Anticipation will be set as required to prevent overshoot.

Overshoot arises naturally from two sources. (1) The thermal mass of the HVAC equipment (e.g. a gas heat exchanger). Turning off the equipment (e.g. gas heat) does not immediately stop heating, as there is a considerable mass of cast iron that is still very hot. (2) The "lag" of the temperature sensor in a thermostat. When the ambient temperature is changing, the sensor temperature always lags behind the ambient (i.e. the air temperature changes first, then the sensor temperature follows).

Factory Access Level

During manufacture, factory access (i.e. access to changing SN) is granted by entry of specific PIN's. In the field, factory access can be gained only by using software running on a host computer linked via an RS232 cable to the Programmable digital thermostat. Factory access cannot be gained via an internal jumper as in previous Programmable digital thermostat versions.

Remote Sensing Kit

An optional Remote Sensor Kit is available.

Kit Contents

The Kit comprises the following items contained in a large cushioned envelope:

Remote Sensor Housing with internal circuit board, sensor, and terminal blocks

Installation Instructions sheet

Connecting Cable, 75-feet, with 4-circuit socket attached to one end for easy connection to the Programmable digital thermostat-3 thermostat.

Remote Sensor Construction Details

The housing is an off-the-shelf plastic box, Serpac CH-6 (1.74"×2.39"×0.755"), of almond color, with added ventilation holes. The "back" of this box is to be affixed to a wall using two screws (of appropriate type depending on wall material, supplied by installer) through the 0.150" diameter holes provided; there is also a ¼" diameter hole in the "back" for entry of the sensor cable through the wall.

Kit Installation

Mount the Programmable digital thermostat-3 thermostat in the desired location. The wiring access hole behind the Programmable digital thermostat should be large enough to accommodate the normal HVAC wires and the Remote Sensor cable with its attached socket. Make the normal HVAC connections to the Programmable digital thermostat's terminal board contained in the wall-mount part of the Programmable digital thermostat enclosure.

Route the Remote Sensor cable thru the wall, with the connector-attached end extending several inches from the wall. Mate the Remote Sensor cable socket to the 4-pin connector 830 that is attached to the back of Programmable digital thermostat's main circuit board (in the removable, front half of the Programmable digital thermostat). Route the Remote Sensor cable as desired to a suitable remote location (see also next step). Avoid routing the cable in close proximity to AC line wiring to minimize pickup of noise from the AC line that might prevent proper operation. The supplied cable is 75-feet in length. Locate the Remote Sensor so that the cable is of sufficient length (including all bends, etc.) to reach from the Programmable digital thermostat-3 to the Remote Sensor, leaving at least a few inches extending from the wall at the remote location. It is not necessary to use the full cable length; excess cable may be coiled within the wall or ceiling or it may be cut off to any desired length. Do not cut the cable while the Programmable digital thermostat is powered, as this will permanently damage the Programmable digital thermostat!

At the remote location, use the "back" half of the Remote Sensor box as a template to locate two mounting holes and a wire access hole. Route the Remote Sensor cable out from the wall through the wire access hole. Mount the "back" half of the box to the wall, passing the remote cable through the wire access hole in the box. Strip back the outer insulation of the cable—being careful not to cut the inner foil shield and drain wire (uninsulated wire)—about 1-2". Then unwrap and cut off the foil shield even with the end of the outer insulation; do not cut the drain wire! Strip back the insulation of each of the three insulated wires about ⅛". Connect the wires as follows to the numbered terminals within the Remote Sensor "back":

1—Red (+5 v)
2—Uninsulated drain wire (Gnd)
3—Black (SDA)
4—Natural/White (SCL)

Push any excess cable back inside the wall. Attach the "front" cover of the Remote Sensor box using the supplied screw.

Mate the "front" cover of the Programmable digital thermostat-3 to its wall-mounted "back", making electrical connections between the Programmable digital thermostat and the previously wired terminal board. Use an appropriate PIN to access the "Sensor Location" menu of the Programmable digital thermostat and set the sensor to "Remote". Reset the Programmable digital thermostat to the Main menu. Installation of the Remote Sensor is complete.

Relative Humidity Control Option

The microcontroller 1020 firmware always assumes that an RH sensor 1010 is present and controls accordingly. If the RH sensor 1010 is not installed, a jumper should be installed to connect the sensor output pin to the ground pin, simulating 0% RH at all times. This will create a demand for only high-speed fan operation, effectively bypassing humidity control.

Data Collection Device (DCD)

It is expected that an IBM-compatible personal computer will be used as the Data Collection Device. This computer should be equipped with an EIA-232 serial port. For computers having, instead, a USB port, an external USB-to-EIA-232 converter should be used.

It behooves the operator of the DCD to observe normal precautions regarding static electricity discharge during use of the DCD to avoid damage to both the DCD and the thermostat. The operator should ensure that any static charge on either the DCD or its RS232 serial cable is discharged BEFORE connecting the DCD to the thermostat's DB9 interface connector! This can generally be done by having the operator touch the metal shell (not the data pins!) of the DB9 connector prior to plugging in the data cable.

The invention can also be included in a kit. The kit can include some, or all, of the components that compose the invention. The invention is ideally suited for retrofit applications, requiring little or no modification to use the invention as an improvement to existing HVAC control systems. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

PRACTICAL APPLICATIONS OF THE INVENTION

A practical application of the invention that has value within the technological arts is in office building environments. The invention can readily replace existing HVAC control systems with little or no modification. There are virtually innumerable uses for the invention, all of which need not be detailed here.

ADVANTAGES OF THE INVENTION

A usage monitoring HVAC control system, representing an embodiment of the invention, can be cost effective and advantageous for at least the following reasons. The invention greatly reduces overhead energy costs by regulating room air temperature settings according to building occupancy. The invention also allows users to be billed individually for HVAC system services, according to their PIN, thereby preventing users from paying more for more HVAC system services than they require. The invention can be used to display accrued HVAC services ordered by each user. The invention also improves quality and/or reduces costs compared to previous approaches.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   receiving a request for an additional period of heating ventilation and air conditioning system services from a requesting system user, the requesting system user being one of a plurality of system users;
   maintaining a data structure in an on board memory of a programmable thermostat, the data structure including a list of time entries, each time entry associated with one of the plurality of system users; and
   updating the data structure by adding a duration in units of time to the time associated with the requesting system user.

2. The method of claim 1, wherein the time entry associated with the requesting user is updated dynamically in real time.

3. The method of claim 1, wherein the on board memory can include a member selected from the group consisting of electrically erasable programmable read only memory, flash memory, random access memory, and network storage devices.

4. A method, comprising:
   receiving a request for an additional period of heating ventilation and air conditioning system services from a requesting system user, the requesting system user being one of a plurality of system users;
   maintaining a data structure in an on board memory of a programmable thermostat, the data structure including a list of time entries, each time entry associated with one of the plurality of system users;
   updating the data structure by adding a duration in units of time to the time associated with the requesting system user; and
   reformatting the data structure to a spreadsheet format that is compatible with software on a central billing computer.

5. The method of claim 1, further comprising uploading the data structure to a central billing computer.

6. The method of claim 1, further comprising satisfying the request for the additional period of heating ventilation and air conditioning system services.

7. A method, comprising:
   receiving a request for an additional period of heating ventilation and air conditioning system services from a requesting system user, the requesting system user being one of a plurality of system users;
   maintaining a data structure in an on board memory of a programmable thermostat, the data structure including a list of time entries, each time entry associated with one of the plurality of system users; and
   updating the data structure by adding a duration in units of time to the time associated with the requesting system user,
   wherein the data structure includes a first segment associated with personal identification numbers and a second segment associated with time entries.

* * * * *